United States Patent
Hiasa

(10) Patent No.: US 11,308,592 B2
(45) Date of Patent: Apr. 19, 2022

(54) IMAGE PROCESSING METHOD, IMAGE PROCESSING APPARATUS, IMAGING APPARATUS, AND STORAGE MEDIUM, THAT CORRECT A CAPTURED IMAGE USING A NEUTRAL NETWORK

(71) Applicant: CANON KABUSHIKI KAISHA, Tokyo (JP)

(72) Inventor: Norihito Hiasa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/583,645

(22) Filed: Sep. 26, 2019

(65) Prior Publication Data

US 2020/0111198 A1 Apr. 9, 2020

(30) Foreign Application Priority Data

Oct. 4, 2018 (JP) .............................. JP2018-188744
Sep. 2, 2019 (JP) .............................. JP2019-159507

(51) Int. Cl.
*G06T 5/50* (2006.01)
*G06T 7/70* (2017.01)
(Continued)

(52) U.S. Cl.
CPC .................. *G06T 5/50* (2013.01); *G06T 3/20* (2013.01); *G06T 3/4023* (2013.01); *G06T 5/003* (2013.01);
(Continued)

(58) Field of Classification Search
CPC .... G06T 5/50; G06T 7/90; G06T 7/70; G06T 3/20; G06T 3/4023; G06T 5/003;
(Continued)

(56) References Cited

U.S. PATENT DOCUMENTS 7,397,418 B1 * 7/2008 Doerry ................ G01S 13/9011
342/196
8,792,014 B2 7/2014 Watanabe
(Continued)

FOREIGN PATENT DOCUMENTS

CN 104079818 A 10/2014
CN 104994307 A 10/2015
(Continued)

OTHER PUBLICATIONS

Mao "Image Restoration Using Convolutional Auto-encoders with Symmetric Skip Connections." arXiv:1606.08921v3. 2016: 1-17.
(Continued)

*Primary Examiner* — Padma Haliyur
(74) *Attorney, Agent, or Firm* — Rossi, Kimms & McDowell LLP

(57) ABSTRACT

An image processing method configured to correct a captured image using a neural network includes a first step of determining an inversion axis for a partial image or a filter of the neural network according to a position in the captured image of the partial image that is part of the captured image, a second step of determining a positional relationship among pixels of color components in an image input to the neural network corresponding to the inversion axis, and a third step of generating a corrected image obtained by correcting an input image by processing, using the neural network, the input image generated from the captured image based on the positional relationship.

16 Claims, 16 Drawing Sheets

(51) Int. Cl.
*H04N 5/232* (2006.01)
*G06T 7/90* (2017.01)
*G06T 3/20* (2006.01)
*G06T 3/40* (2006.01)
*G06T 5/00* (2006.01)
*G06T 5/20* (2006.01)

(52) U.S. Cl.
CPC ............ *G06T 5/20* (2013.01); *G06T 7/70* (2017.01); *G06T 7/90* (2017.01); *H04N 5/23229* (2013.01); *G06T 2207/10024* (2013.01); *G06T 2207/20021* (2013.01); *G06T 2207/20081* (2013.01); *G06T 2207/20084* (2013.01); *G06T 2207/20212* (2013.01)

(58) Field of Classification Search
CPC .......... G06T 5/20; G06T 2207/10024; G06T 2207/20021; G06T 2207/20081; G06T 2207/20084; G06T 2207/20212; G06T 2207/20076; H04N 5/23229; G06N 3/0454
See application file for complete search history.

(56) References Cited

U.S. PATENT DOCUMENTS

| | | | | |
|---|---|---|---|---|
| 8,941,762 B2 * | 1/2015 | Hatakeyama | .......... | H04N 9/045 348/242 |
| 9,167,168 B2 * | 10/2015 | Ebe | .................. | H04N 5/23229 |
| 9,710,895 B2 * | 7/2017 | Hayashi | ................. | G06T 5/003 |
| 2011/0193997 A1 * | 8/2011 | Hatakeyama | .......... | H04N 5/217 348/241 |
| 2018/0061019 A1 * | 3/2018 | Wachi | .................... | G06T 5/003 |
| 2018/0061020 A1 * | 3/2018 | Hiasa | ........................ | G06T 5/50 |
| 2018/0063453 A1 * | 3/2018 | Hiasa | ................. | H04N 5/35563 |
| 2018/0158175 A1 | 6/2018 | Shmunk | | |

FOREIGN PATENT DOCUMENTS

| | | |
|---|---|---|
| CN | 106875361 A | 6/2017 |
| CN | 107424126 A | 12/2017 |
| EP | 3333765 A1 | 6/2018 |
| JP | 5274623 B2 | 8/2013 |
| JP | 5541750 B2 | 7/2014 |

OTHER PUBLICATIONS

Chakrabarti. "Learning Sensor Multiplexing Design through Backpropagation." arXiv:1605.07078v1 [cs.LG] May 23, 2016. pp. 1-9.
Extended European Search Report issued in European Appln. No. 19200469.5 dated Feb. 7, 2020.
Lu. "Research on Neural Network of Non-Linear Image Distortion Correction and Identification Technology." China Jiliang University. Mar. 2013. English abstract provided.
Office Action issued in Chinese Appln. No. 201910926316.6 dated May 7, 2021. English translation provided.
Notice of Allowance issued in Chinese Application No. 201910926316.6 dated Jan. 6, 2022.

* cited by examiner

FIG. 16C

IMAGE PROCESSING METHOD, IMAGE PROCESSING APPARATUS, IMAGING APPARATUS, AND STORAGE MEDIUM, THAT CORRECT A CAPTURED IMAGE USING A NEUTRAL NETWORK

BACKGROUND OF THE INVENTION

Field of the Invention

The present invention relates to an image processing method that corrects an optical performance deterioration of a captured image.

Description of the Related Art

A technique for solving a regression problem through deep learning and for estimating various output images based on an input image has conventionally been proposed. The deep learning is machine learning using a multilayer neural network. The introduction of strong nonlinearity by the multilayer and high generalization performance by learning using a large amount of learning images enable a high-precision estimation for an unknown input image.

X. Mao, C. Shen, Y. Yang, "Image Restoration Using Convolutional Auto-encoders with Symmetric Skip Connections", https://arxiv.org/abs/1606.08921. ("Mao et al.") discloses a configuration of a convolutional neural network (CNN) applicable to a variety of regression problems. Mao et Al. discloses upsampling of an input image, JPEG deblocking (removing compression noises), denoising, non-blind blur corrections, and inpainting using a convolutional neural network.

However, when the method disclosed in Mao et al. corrects the optical performance deterioration of the captured image, a data amount of the retained filter increases or the correction accuracy decreases. The optical performance degradation refers to a blur caused by the aberration and diffraction of the imaging optical system used for capturing a captured image, a blur caused by an optical low-pass filter or a pixel aperture in an image sensor, and the like. Hereinafter, the optical performance deterioration will be simply referred to as the blur.

The aberration of the imaging optical system changes according to a zoom, an F-number (aperture value), an in-focus distance, an image height, and an azimuth. Thus, the method disclosed in Mao et al. that corrects only a single blur cannot correct all captured images captured by the imaging optical system. Although it is possible to individually learn and correct a filter for each of a plurality of blurs with different zooms, F-numbers, in-focus distances, image heights, or azimuths, a filter data amount to be stored becomes enormous.

Another conceivable method is to collectively learn all of a plurality of blurs having different zooms, F-numbers, in-focus distances, image heights, and azimuths. This can be realized by preparing a ground truth image and blurred images for all of the plurality of blurs, and by mixing them to learn the CNN. However, a high correction effect cannot be obtained if the plurality of blurs include greatly different blurs.

SUMMARY OF THE INVENTION

The present invention provides an image processing method, an image processing apparatus, an imaging apparatus, a program, and a storage medium, each of which can correct an optical performance deterioration of a captured image with high accuracy while reducing a data amount.

An image processing method according to one aspect of the present invention is configured to correct a captured image using a neural network and includes a first step of determining an inversion axis for a partial image or a filter of the neural network according to a position in the captured image of the partial image that is part of the captured image, a second step of determining a positional relationship among pixels of color components in an image input to the neural network corresponding to the inversion axis, and a third step of generating a corrected image obtained by correcting an input image by processing, using the neural network, the input image generated from the captured image based on the positional relationship.

An image processing apparatus according to another aspect of the present invention includes an inversion determiner configured to determine an inversion axis for a partial image or a filter of the neural network according to a position in the captured image of the partial image that is part of the captured image, a color determiner configured to determine a positional relationship among pixels in color components of an image input to the neural network corresponding to the inversion axis, and a transmitter configured to transmit an input image generated from the captured image based on the positional relationship to another processing apparatus that corrects the captured image using the neural network. The other processing apparatus generates a corrected image by correcting the input image by processing a received input image using the neural network.

An imaging apparatus according to another aspect of the present invention includes an imager configured to capture an object image, and the above image processing apparatus.

An image processing system according to another aspect of the present invention includes a first apparatus and a second apparatus. The first apparatus includes a transmitter configured to transmit a request for causing the second apparatus to execute processing for correcting a captured image. The second apparatus includes a receiver configured to receive the request, an inversion determiner configured to determine an inversion axis for a partial image or a filter of the neural network according to a position in the captured image of the partial image that is part of the captured image, a color determiner configured to determine a positional relationship among pixels in color components of an image input to the neural network corresponding to the inversion axis, and a generator configured to generate a corrected image obtained by correcting an input image by processing the input image generated from the captured image based on the positional relationship using the neural network.

Further features of the present invention will become apparent from the following description of exemplary embodiments with reference to the attached drawings.

BRIEF DESCRIPTION OF THE DRAWINGS

FIGS. 16A to 16C are explanatory diagrams of a reference order of a convolution operation according to the second embodiment.

DESCRIPTION OF THE EMBODIMENTS

Figure 1:
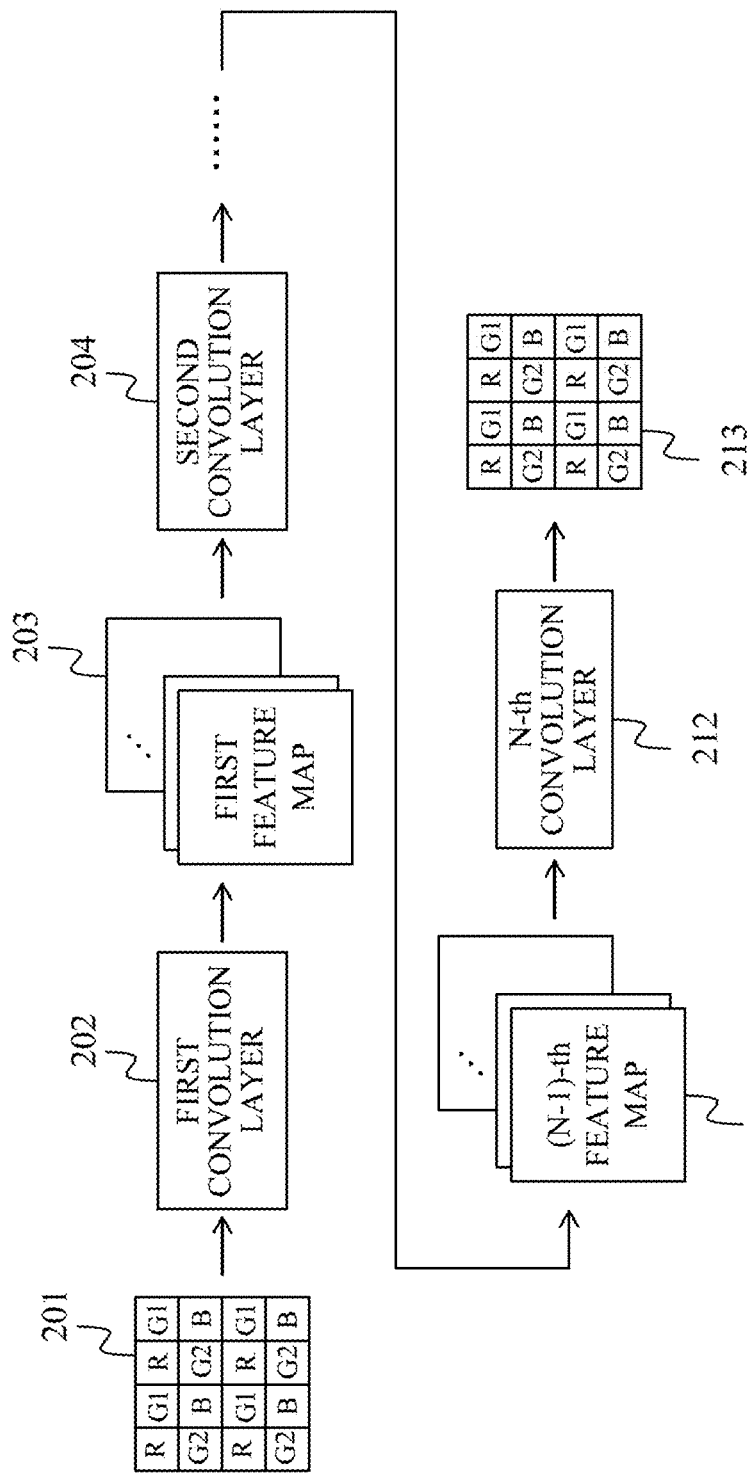
FIG. 1 is an explanatory diagram of a convolutional neural network according to first and third embodiments.

Referring now to the accompanying drawings, a description will be given of embodiments according to the present invention. Corresponding elements in respective figures will be designated by the same reference numerals, and a duplicate description thereof will be omitted.

A description will now be given of definitions of terms and an outline of the invention. A multilayer convolutional neural network (CNN) is used to correct an optical performance degradation (blur). The blur correction by the CNN includes a processing step for learning a filter (weight) of a neural network (also simply referred to as a "network" hereinafter) and a processing step for correcting a blur on an unknown input using the learned filter. The former will be called a learning step, and the latter will be called a correction step. Next, a name of an image is determined in the learning step and the correction step. An image to be input to the network will be referred to as an input image, and an input image with a known ground truth image used for the learning step will be referred to as a training image. An image output from the network will be referred to as an output image, and an output image in the correction step will be particularly referred to as a corrected image. The ground truth image will be an image corresponding to an ideal output image in which a blur is corrected in the training image.

In the present invention, the input image and the ground truth image are RAW images having a plurality of color components. The plurality of color components each have information on a different position in the object space, such as a Bayer array. A RAW image indicates undeveloped image data. Since the output image is also generated as an image according to the ground truth image by the correction, it has a property of a RAW image. Making the input and output images a RAW image requires no development processing and thus the user can immediately edit the captured image in which the blur has been corrected. Further, by simultaneously inputting a plurality of color components to the network, object information (such as an edge) in a different color component can be used for the blur correction. Thus, the blur correction for each color component can improve the correction accuracy while reducing (suppressing) the data amount of the filter.

The present invention considers a rotational symmetry of the aberration around the optical axis in the blur correction of the RAW image using the CNN. Thereby, the freedom degree of the blur to the azimuth can be reduced. In addition, using the inversion that does not cause the interpolation degradation and canceling a change of the color component positional relationship (arrangement of the color filter array) caused by the inversion can highly accurately correct a blur even for an unlearned azimuth. Further, the data amount of the filter to be stored can be reduced.

First Embodiment

A description will now be given of an image processing method according to a first embodiment of the present invention. This embodiment will discuss an imaging system that executes an image processing method using an imaging apparatus. In this embodiment, there is a learning apparatus that executes the learning step, in addition to the imaging apparatus that executes the correction step.

Figure 2:
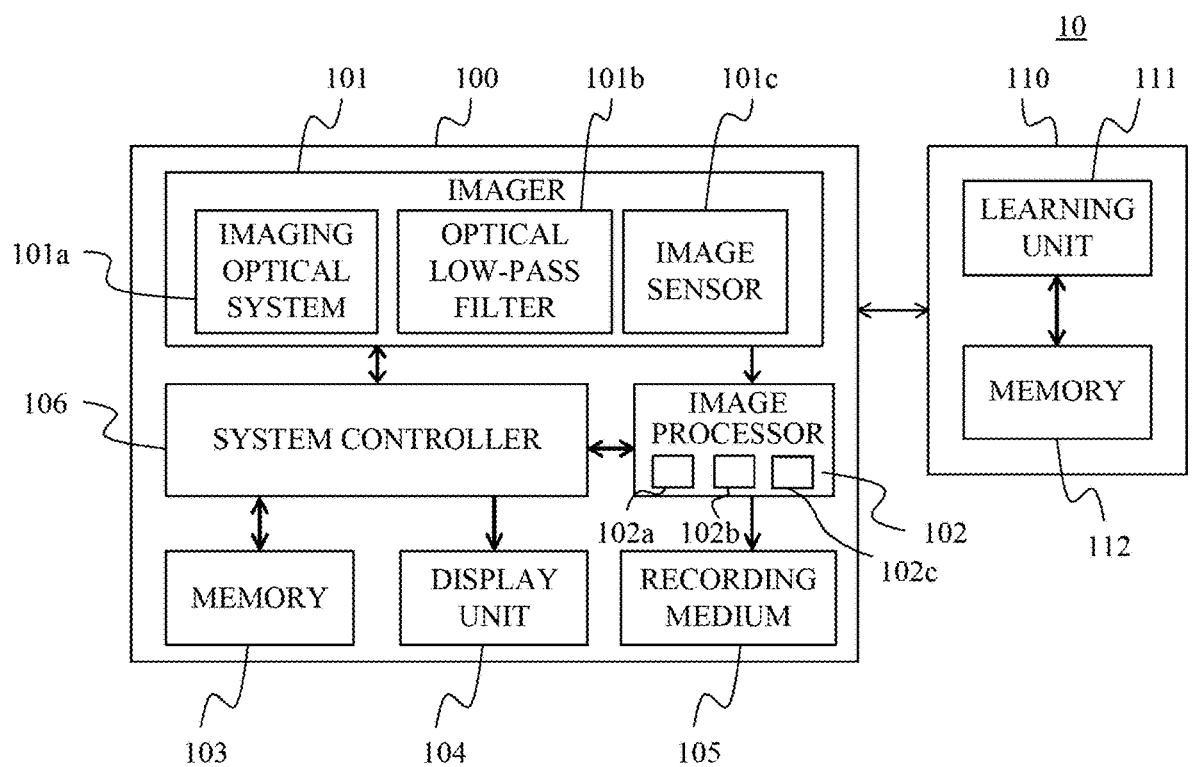
FIG. 2 is a block diagram of an imaging system according to the first embodiment.
Figure 3:
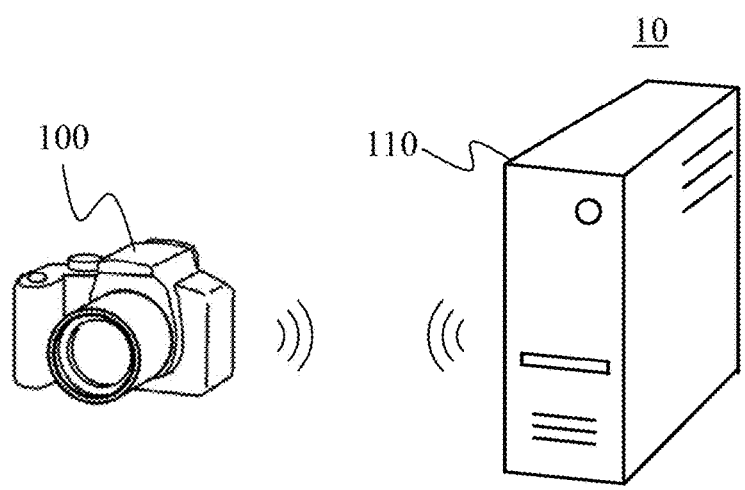
FIG. 3 is an overview of the imaging system according to the first embodiment.

Referring now to FIGS. 2 and 3, a description will be given of an imaging system 10 according to this embodiment. FIG. 2 is a block diagram of the imaging system 10. FIG. 3 is an overview of the imaging system 10. The imaging system 10 includes an imaging apparatus 100 and a learning apparatus 110.

The imaging apparatus 100 captures an image in the object space, and a blur in the captured image is corrected by the CNN. For the correction, a filter learned by the learning apparatus 110 is used. The captured image is captured by an imager 101. The imager 101 includes an imaging optical system 101a, an optical low-pass filter 101b, and an image sensor 101c. However, the optical low-pass filter 101b is not essential. In this embodiment, the imaging apparatus 100 is an interchangeable lens type imaging apparatus, and the imaging optical system 101a (interchangeable lens) is attachable to and detachable from a camera body including the image sensor 101c, and a variety of types of interchangeable lenses are attachable to the camera body.

Light that has entered the imager 101 from the object space passes through the imaging optical system 101a and the optical low-pass filter 101b, and then is received by the image sensor 101c. The received image of the object space is blurred by each of the aberration and diffraction of the imaging optical system 101a, the optical low-pass filter 101b, and the pixel aperture of the image sensor 101c. The captured image is input to an image processor 102. The image processor 102 includes an inverter (inversion determiner) 102a, a changer (color determiner) 102b, and a generator 102c, and performs a blur correction by the image processing method according to this embodiment. The image processor 102 performs other development processing. For the blur correction, a filter learned by the learning apparatus 110 is used. The learning apparatus 110 learns a CNN filter in advance by the learning unit 111 for each of the plurality of imaging optical systems 101a that can be attached to the imaging apparatus 100 and stores the CNN filter in a memory (storage unit) 112.

The imaging apparatus 100 and the learning apparatus 110 are connected by wire or wirelessly. The imaging apparatus 100 can read out a filter corresponding to the type of the imaging optical system 101a from the memory 112 at an arbitrary timing. The read filter information is stored in the memory (storage unit) 103. Details regarding a blur correction executed by the image processor 102 and filter learning executed by the learning unit 111 will be described later with reference to a flowchart. The blur-corrected captured image (corrected captured image) is stored in a recording medium 105 and displayed on a display unit 104 when the user views the image. The image processor 102 may read a captured image that is stored in the recording medium 105 and has not yet received a blur correction, and may perform the blur correction described above. The above processing is controlled by the system controller 106.

Figure 4:
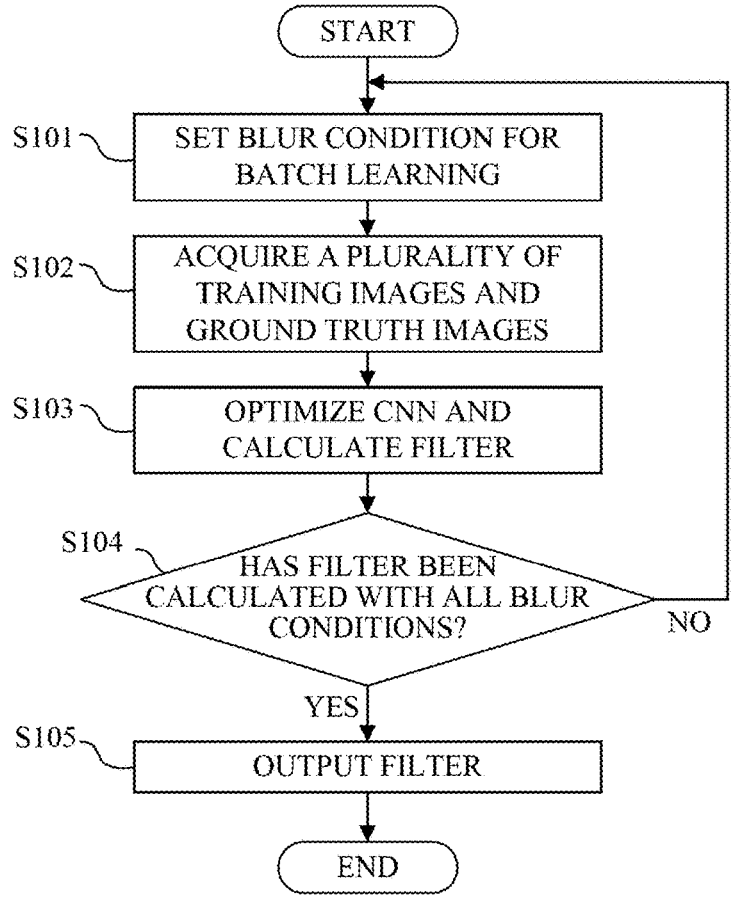
FIG. 4 is a flowchart of learning step according to the first to third embodiments.

Referring now to FIG. 4, a description will be given of the learning step executed by the learning unit 111. FIG. 4 is a flowchart of the learning step. Each step in FIG. 4 is mainly executed by the learning unit 111.

First, in the step S101, the learning unit 111 sets a blur condition for batch learning. The learning condition refers to a factor that can change a blur. More specifically, a type of the lens (imaging optical system 101a), a lens state of the imaging optical system during imaging, the image height and azimuth, the pixel pitch, the pixel aperture and the arrangement of the color filter array of the image sensor, and the presence/absence and type of an optical low-pass filter. The lens state refers to the zoom, the F-number, and the in-focus distance. Since the imaging apparatus 100 is an interchangeable lens type imaging apparatus, different types of imaging optical systems 101a can be attached. This embodiment learns the CNN filter used to correct the blur for each type of the imaging optical system 101a.

The lens state is divided into a plurality of types for one type of imaging optical system 101a, and learning is individually performed for each divided lens state. For example, as illustrated in the explanatory diagram of the division of the lens state in FIG. 5, the lens state space is divided which sets, to an axis, each of the zoom (unnecessary in case of a single focus lens) Z, F-number F, and in-focus distance D. For example, by setting i, j, k=1, 2, and blurs in the subspace of the lens state having 8 points (Zi, Fj, Dk) as vertices are collectively learned. For a captured image captured at the zoom, F-number, and in-focus distance belonging to the subspace of the lens state, the blur is corrected using the same filter.

The blur caused by the aberration and diffraction has a rotational symmetry around the optical axis when the imaging optical system 101a includes a lens that is rotationally symmetric with respect to the optical axis and a substantially circular diaphragm. Thus, only the image height change is learned for the angle of view, and the azimuth change can be dealt with by rotating the learned result (filter) or the input image. However, a filter having a high frequency component may exist in the learning result of deep learning, and the interpolation degradation due to the rotation becomes a problem. When the input image is rotated, the interpolation deterioration similarly occurs. Thus, the inversion without the interpolation degradation is used. For the blur that is rotationally symmetric with respect to the optical axis, once the blur change is learned only in the one-eighth region in the image circle (45° of the total image height or azimuth), the remaining seven-eighths region can be corrected by inverting the filter or the input image. In other words, the same filter can be used to correct different positions in the captured image by performing the inversion processing for the filter or the input image.

The action of the optical low-pass filter may not have four-fold symmetry. For example, the point spread function (PSF) of the optical low-pass filter that separates two points only in the vertical or horizontal direction has only a two-fold symmetry. In this case, it is only necessary to learn the blur corresponding to the quarter region instead of the one-eighth region in the image circle.

Since the optical low-pass filter 101b according to this embodiment is a four-point separation (two-point separation for each of vertical and horizontal directions), the blur change in the one-eighth region in the image circle is learned. Thereby, the freedom degree of the blur change to the blur azimuth is reduced, and the data amount of the filter can be reduced.

Figures 6A, 6B:
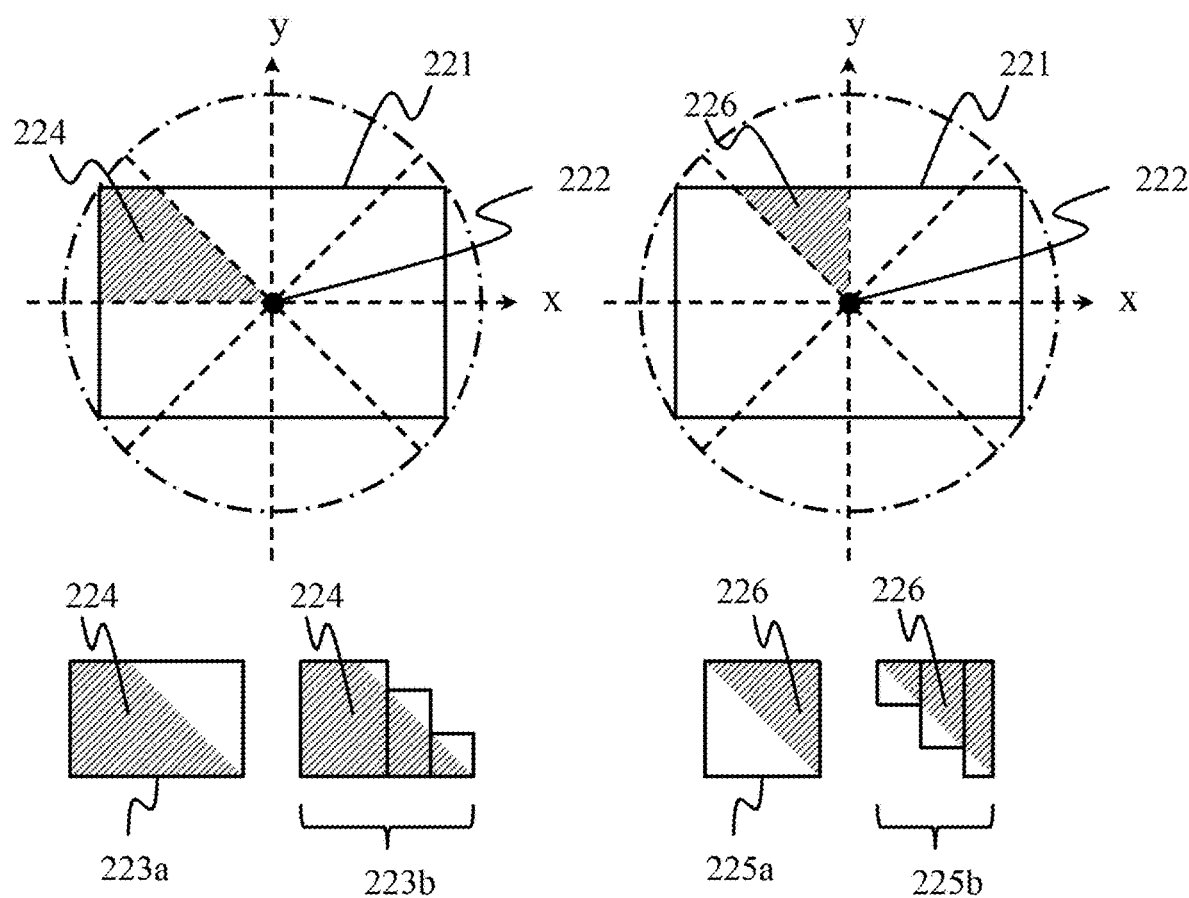
FIG. 6A and FIG. 6B are explanatory diagrams of an azimuth division and partial image extraction according to the first embodiment.

FIG. 6A illustrates the image height of the blur and the azimuth range to be learned. In FIG. 6A, an alternate long and short dash line represents an image circle, a solid line represents a captured image 221, and a black dot 222 represents a point (reference point) corresponding to the optical axis of the imaging optical system 101a. In this embodiment, the blur of the image height and azimuth range indicated by a hatched portion 224 is learned. The limited range within the captured image 221 can minimize the blur variation included in learning. The range of the image height and azimuth is not limited to the position of the hatched portion 224 in FIG. 6A, and may be another position as long as it is an area of one-eighth of the image circle. However, in learning only the range that falls within the captured image 221, the azimuth is selected from one of 0°≤θ≤45°, −45°≤θ≤0°, 135°≤θ≤180°, and −180°≤θ≤−135°. All blurs that act on the captured image cannot be learned in other ranges. The origin of the azimuth is located in a positive area on the x-axis (longitudinal direction of the captured image).

Figure 7:
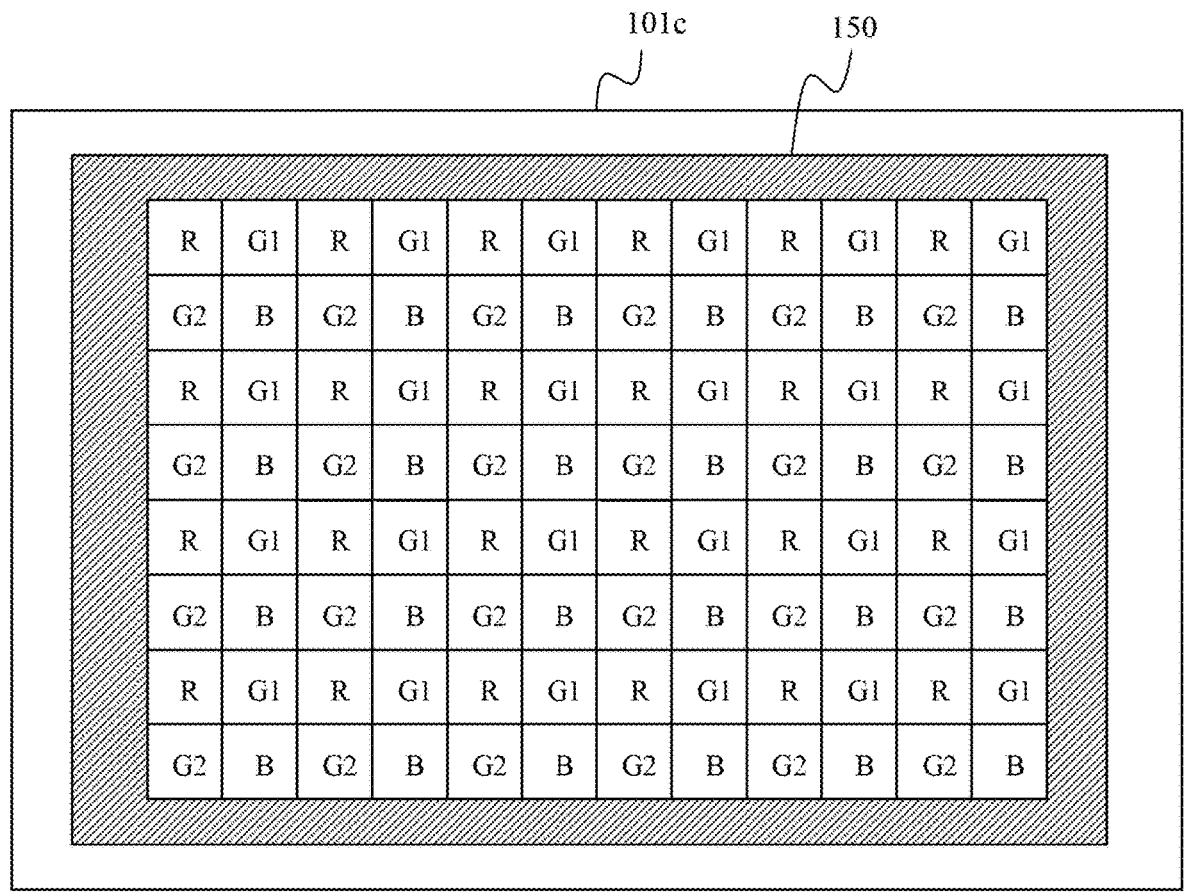
FIG. 7 is a pixel arrangement diagram of an image sensor according to the first embodiment.

Next follows a description of the pixel pitch and pixel aperture, the arrangement of the color filter array, and the optical low-pass filter. In this embodiment, the optical low-pass filter 101b and the image sensor 101c in the imaging apparatus 100 do not changed. The optical low-pass filter 101b accords with a four-point separation method as described above. The color filter array of the image sensor 101c has the pixel arrangement illustrated in FIG. 7. A hatched part 150 in FIG. 7 is an optical black region. A light receiving region formed in the region surrounded by the optical black region has a Bayer array structure in which the upper left pixel is R (red). G1 and G2 represent green, and B represents blue. A signal imaged in the light receiving area is a captured image.

When the position of the pixel in the light receiving area is expressed as (i, j) using the row and column indices, the arrangement of the color filter array is described by describing the color filter of the pixel in order of (1, 1), (1, 2), (2, 1), and (2, 2). The arrangement of the color filter array in this embodiment is R, G1, G2, and B. Thus, the blur condition is set such that the pixel pitch and the pixel aperture are set to the values employed by the image sensor 101c, and the arrangement of the color filter array and the optical low-pass filter are fixed by the four-point separation to R, G1, G2, and B. The color filter array is not limited to the Bayer array. The present invention is similarly applicable to other arrangements such as a honeycomb structure in which a plurality of color components are acquired by the space division.

Next, in the step S102 in FIG. 4, the learning unit 111 acquires a plurality of training images and ground truth image. Since the captured image is a RAW image, the training image and the ground truth image are also RAW images. The training image and the ground truth image are images in which the same object is captured, and that are different from each other in the presence or absence of the blur. The training image can be generated, for example, by adding the blur through simulation to a RAW image (ground truth image) that is less affected by the blur. The blur that is not included in the learning step or the structure of the object (such as an edge) cannot be accurately corrected in the subsequent correction step. Hence, a large number of ground truth images in which a variety of objects are captured are prepared, and training images are generated by applying blurs of the partial space, image height, and azimuth in the set lens state to them.

The blur can be generated by the following method, for example. The lens state, the image height, and the azimuth are determined, an optical transfer function (OTF) is calculated from a designed value of the imaging optical system 101a, and a product of the frequency characteristics of the optical low-pass filter and the pixel aperture is calculated. The OTF of the blur can be generated by calculating the weight sum for each wavelength using the spectral characteristic of the color filter and by folding back at the Nyquist frequency of each color. If an infrared cutting filter or the like is included, its characteristic is also considered. Further, the noise generated by the image sensor 101c may be added to the training image. A different filter may be learned for each noise intensity, and a correcting filter may be properly selected based on the noise level of the captured image (which can be determined based on the ISO speed or the like).

Next, in the step S103, the learning unit 111 optimizes the CNN and calculates a filter using a plurality of training images and ground truth images. FIG. 1 is an explanatory diagram of the CNN. The CNN has a plurality of convolution layers. For the input image 201 which is the training image, the sum of convolution with a plurality of filters and bias is calculated with the first convolution layer 202. A first feature map 203 is a summary of the results calculated for each filter. The first feature map 203 is input to the second convolution layer 204, and similarly the sum of the convolution with a plurality of new filters and the bias is calculated. An output image 213 is obtained by repeating this operation and by inputting an (N−1)-th feature map 211 to an N-th convolution layer 212. Here, N is a natural number of 3 or higher. In general, it is said that the CNN having three or more convolution layers corresponds to deep learning. In each convolution layer, a nonlinear conversion using an activation function is executed in addition to the convolution. Examples of the activation function include a sigmoid function and ReLU (Rectified Linear Unit). However, the nonlinear transformation need not be executed in the last N-th convolution layer.

The filter of each convolution layer and the initial value of bias are determined, for example, by a random number. An error between the output image and the ground truth image is calculated, and the filter and the bias are updated by using the error back propagation method or the like so as to reduce the error. After the filter and the bias converge, the learning unit 111 determines the values of the filter and the bias on the assumption that the learning is finished. The convergence can be determined by the update amount, the number of updates, and the like. A deconvolution layer may be used instead of the convolution layer, and a pooling layer or the like may be added as necessary. The output image may be set to the sum of the output of the N-th convolution layer and the input image. This network that learns a difference between the output image and the input image is called a residual network. At this time, the bias may be fixed to zero. Moreover, the GAN (Generative Adverbial Network) etc. may be used for the network.

Next, in the step S104 in FIG. 4, the learning unit 111 determines whether or not the calculation of the filter has been completed for all of the predetermined blur conditions. When the calculation of the filter has been completed for all blur conditions, the flow proceeds to the step S105. On the other hand, when the calculation of the filter has not yet been completed, the flow returns to the step S101. Since this embodiment divides the lens state space into a plurality of parts, the learning unit 111 newly selects a lens state for which no filter is calculated. Next, in the step S105, the learning unit 111 outputs a filter. The filter calculated and output by the learning unit 111 is stored in the memory 112.

Figure 8:
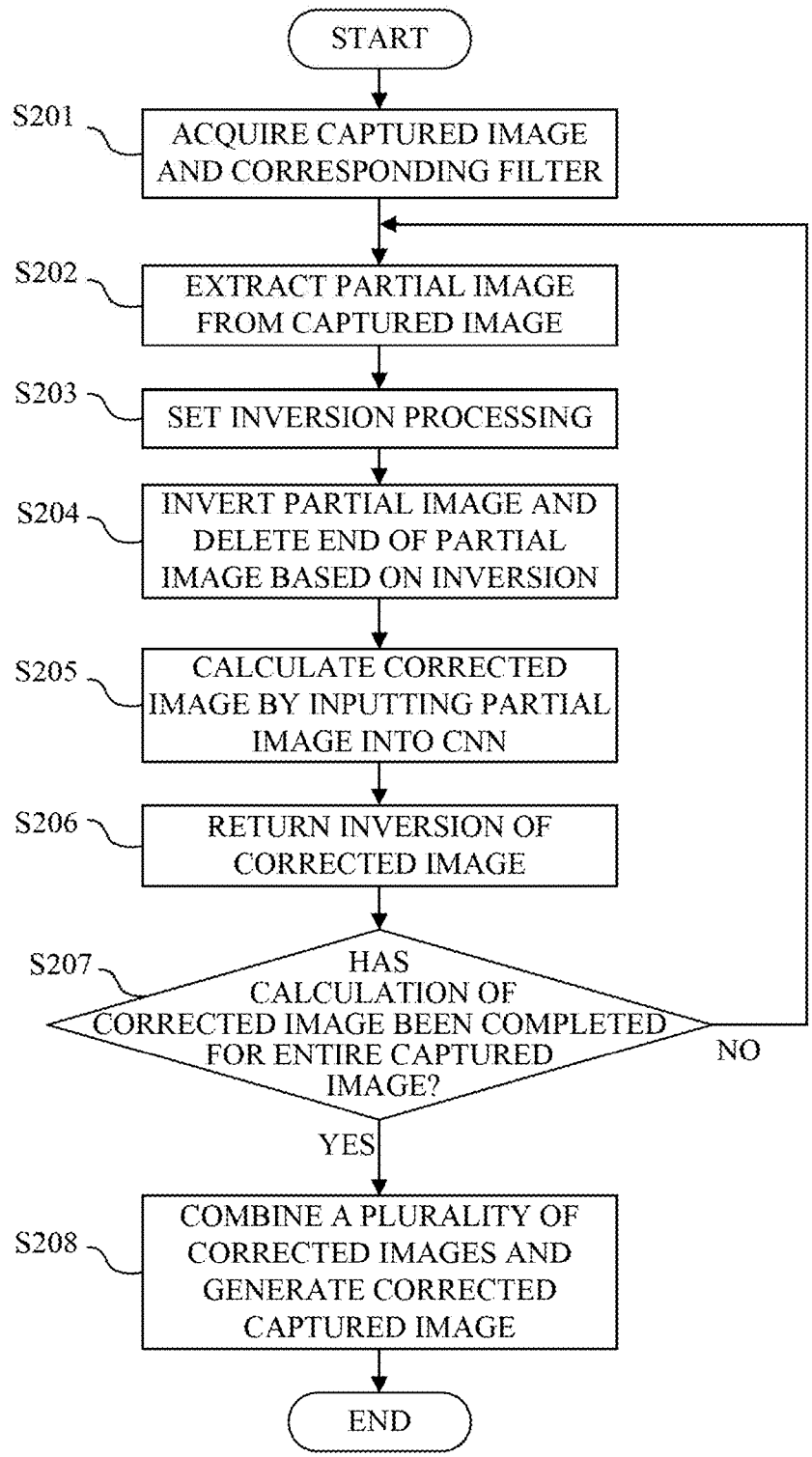
FIG. 8 is a flowchart of correction step according to the first embodiment.

Referring now to FIG. 8, a description will be given of the correction step (blur correction) of a captured image executed by the image processor 102. FIG. 8 is a flowchart of the captured image correction step. Each step in FIG. 8 is mainly executed by the image processor 102 based on a command from the system controller 106.

First, in the step S201, the image processor 102 acquires a captured image, and reads out a filter corresponding to the acquired captured image from the memory 103. In this embodiment, the image processor 102 specifies a filter to be read based on information on a lens state when a captured image is obtained. The information on the lens state can be acquired, for example, from header information of the captured image.

Next, in the step S202, the image processor 102 extracts a partial image (partial region in the captured image to be corrected) from the captured image. The size of the partial image does not necessarily match the training image. FIGS. 6A and 6B illustrate extraction examples of the partial image. In a region where the area of the captured image 221 is large among the regions made by dividing the image circle into eight parts, the partial image 223a or 223b is extracted as illustrated in FIG. 6A. The partial image 223a is one partial image including the entire hatched portion 224. The partial images 223b are a plurality of partial images including the entire hatched portion 224 that is divided. The number of partial images 223b may be any number.

Similarly, in the region where the area of the captured image 221 is small, the partial image 225a or 225b is extracted as illustrated in FIG. 6B. The partial image 225a is one partial image including all of the hatched portion 226. The partial image 225b includes a plurality of partial images that include the entire hatched portion 226 in a divided manner. In the case of the partial image 225a, the one-eighth region can be corrected by a single calculation by the CNN, but the area of an extra region (a region where the correct correction other than the hatched portion 226 is not performed) increases. The partial image 225b needs to be calculated for each partial image, but the area of the extra area is small. Which one to select may be determined according to the calculation time and the memory capacity. An extra area of the partial image that is not correctly corrected is deleted during the combination in the step S208. Which azimuth range the partial image corresponds to may be determined based on the area occupied by each azimuth range for the partial image.

Figure 9:
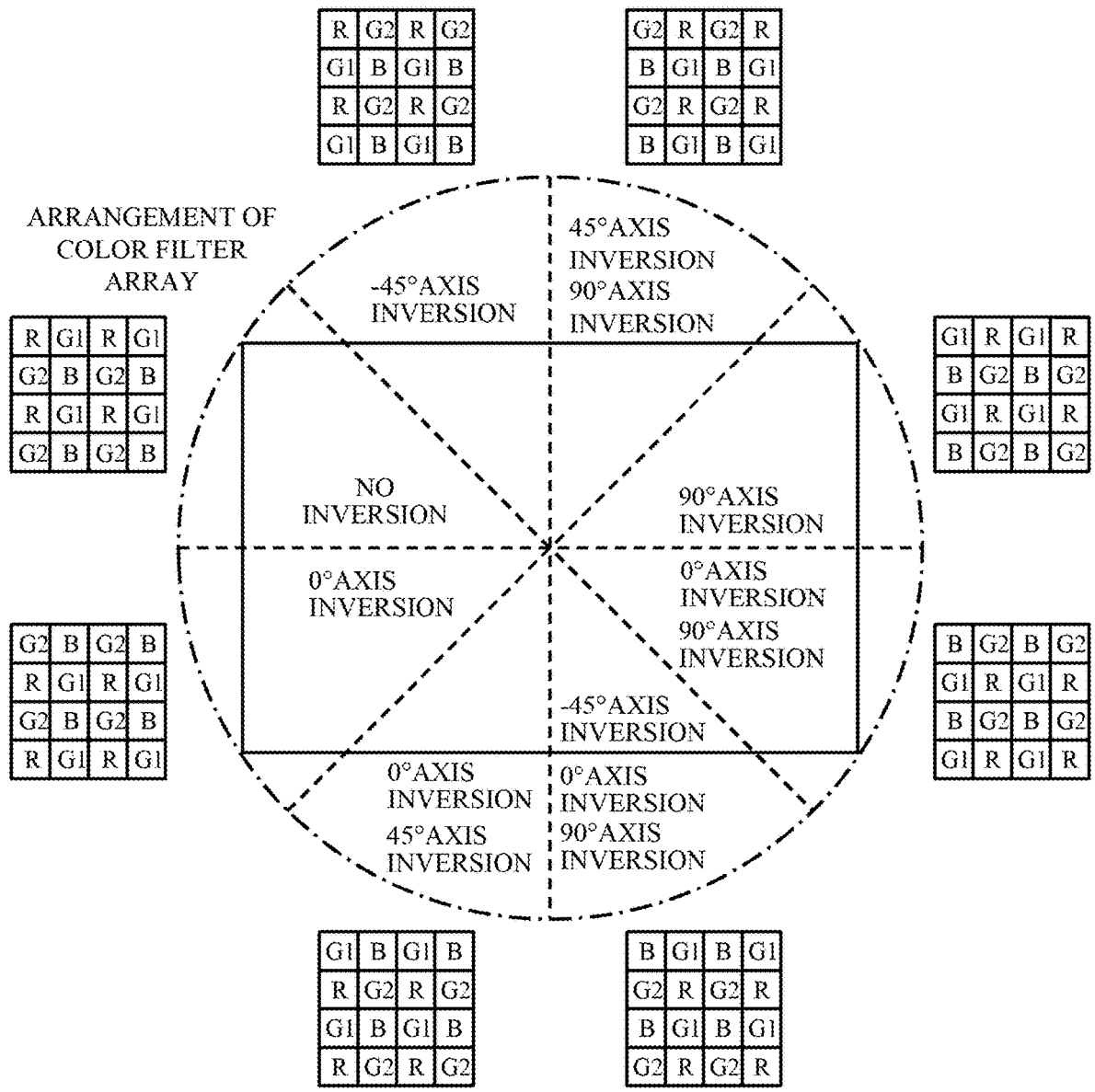
FIG. 9 illustrates a relationship between inversion processing of each azimuth range and an arrangement of a color filter array according to the first embodiment.

Next, in the step S203, the image processor 102 (inverter 102a) sets (controls) inversion processing for the partial image based on the position of the partial image in the captured image. In other words, the image processor 102 determines an inversion axis (an axis in the inversion processing) based on the positional relationship between the azimuth range learned for the filter and the azimuth range corresponding to the partial image extracted in the step S202 (it can be also said that the type of inversion processing is switched). In this embodiment, since the learning unit 111 performs learning in the azimuth range of 135°≤θ≤180°, the inversion axis in each azimuth range is as illustrated in FIG. 9. FIG. 9 illustrates the relationship between the inversion processing of each azimuth range and the arrangement of the color filter array after the inversion processing. The inversion processing is controlled for each of −45°, 0°, 45°, and 90° axes (presence/absence of inversion processing and type of inversion processing (−45° axis inversion, 0° axis inversion, 45° axis inversion, 90° axis inversion).

Next, in the step S204 in FIG. 8, the image processor 102 (changer 102b) performs the inversion processing of the partial image based on the inversion processing setting (presence/absence of inversion or inversion type) switched in the step S203. Then, based on the inversion processing (inversion axis), the positional relationship among the color components is changed to a positional relationship corresponding to the inversion processing (inversion axis). By performing the inversion processing of the partial image, the learned filter of the azimuth range of 135°≤θ≤180° can be applied to the entire azimuth range, but the arrangement of the color filter array of the partial image may change due to the inversion. Since the learned arrangement of the color filter array is R, G1 G2, and B, the correct blur correction cannot be performed unless the input image matches this array. Hence, the arrangement of the color filter array is changed based on the inversion axis of the inversion processing applied to the partial image.

In FIG. 9, since it is unnecessary to distinguish G1 and G2 from each other, it is unnecessary to change the arrangement of the color filter array in the azimuth range of 90°≤θ≤135°. In other words, the arrangement of the color filter array may be maintained in the second quadrant. Next, in the first quadrant of 0°≤θ≤90°, the arrangement of the color filter array of R, G1, G2, and B can be changed by deleting the first column and the last column of the partial image. In the third quadrant, the arrangement of the color filter array of R, G1, G2, and B can be changed by deleting the first row and the last row. In the fourth quadrant, the color filter array of R, G1, G2, and B can be changed by deleting the first row, the last row, the first column, and the last column.

A shift may be used instead of deleting row and column components. For example, instead of deleting the first column and the last column, the arrangement of the color filter array can be changed by shifting the first column to the back of the last column. Conversely, the last column may be shifted to the front of the first column. The same applies to the row. In addition, in using either the deletion or the shift, a correct blur-correction result cannot be obtained at the edge of the partial image. Hence, the partial images (a plurality of partial images) extracted from the captured image may have an overlap portion (portion common to each other). At least two of the plurality of partial images may have a common portion. For the most extreme pixel in the captured image having no overlap, for example, the pixel value of the captured image as it is after the blur correction may be used. The step S204 in this embodiment performs change processing of the color component positional relationship after the inversion processing, but the change processing of the color component positional relationship may be performed and then the inversion processing may be performed. This embodiment determines the positional relationship among the color components in the input image based on the inversion axis of the inversion processing applied to the partial image. However, the present invention is not limited to this embodiment. Since the position of the region to be corrected in the captured image corresponds to the inversion axis, the positional relationship among the color components may be determined directly from the position of the region to be corrected in the captured image. In any case, the step S204 may determine the positional relationship among the color components of the input image so as to cancel the change in the positional relationship among the color components caused by the inversion corresponding to the inversion axis determined in the step S203.

Next, in the step S205 in FIG. 8, the image processor 102 inputs to the CNN an input image generated by performing the inversion processing and processing for changing the arrangement of the color filter array for the partial image, and calculates the corrected image. The corrected image corresponds to the partial image having a corrected blur. The CNN is the same as the network used during learning, and uses the filter acquired in the step S201. The filter may be acquired any time as long as the step S205.

Next, in the step S206, the image processor 102 returns the inversion of the corrected image. In other words, the image processor 102 performs the inversion processing for the corrected image reverse to the inversion processing performed in the step S204. If a shift is used to change the arrangement of the color filter array, the shift is returned. Instead of inverting the partial image, the filter to be convoluted in the step S205 may be inverted. In this case, the step S206 is unnecessary. However, even when the filter is inverted, it is necessary to change the arrangement of the color filter array executed in the step S204. The inversion of the partial image or the filter includes the inversion of the reference order of one of the arrays in the convolution operation.

Next, in the step S207, the image processor 102 determines whether calculation of the corrected image has been completed for the entire captured image. If the calculation of the corrected image has not been completed, the flow returns to the step S202, and the image processor 102 extracts a new partial image. On the other hand, when the calculation of the corrected image has been completed, the flow proceeds to the step S208.

In the step S208, the image processor 102 (generator 102c) combines a plurality of corrected images, and generates a corrected captured image in which the blur of the captured image is corrected. In other words, the image processor 102 generates the corrected captured image by connecting eight corrected images obtained by correcting each azimuth range of the captured image.

The above image processing method can suppress an increase in the data amount of the filter to be stored and correct the optical performance deterioration of the captured image with high accuracy. It is always unnecessary to actually extract the partial image from the captured image. For example, each of the input images obtained by performing different inversion processing for the entire captured image and by changing the positional relationship among the color component receives the blur correction according to this embodiment to obtain a plurality of corrected images. Thereafter, a corrected captured image may be generated by cutting out only a region (a region corresponding to a portion (corresponding to a partial image) to be corrected in each input image) that is correctly corrected in each of the obtained corrected images. However, in this case, the calculation load increases and thus may be considered.

Second Embodiment

A description will now be given of an image processing method and an image processing system according to a second embodiment of the present invention. This embodiment provides a learning unit that executes the learning step separate from the image processing apparatus that executes the correction step (blur correction). The correction step uses not only the CNN but also the inverse filter-based correction step.

Figure 10:
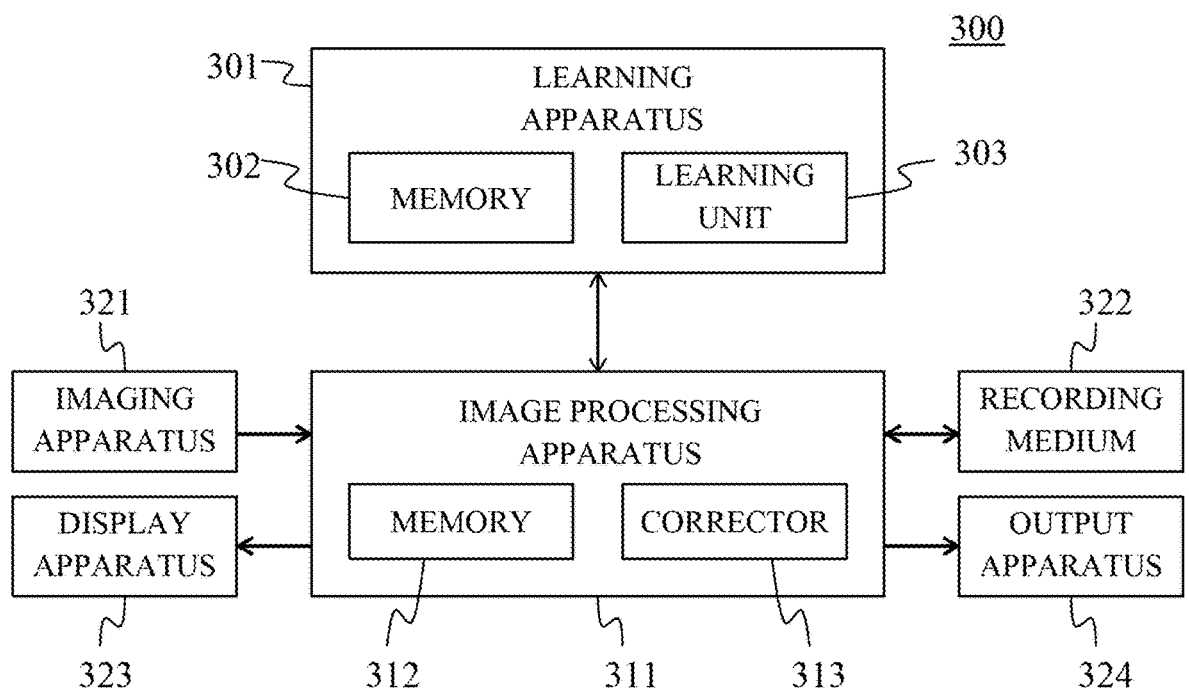
FIG. 10 is a block diagram of an image processing system according to a second embodiment.
Figure 11:
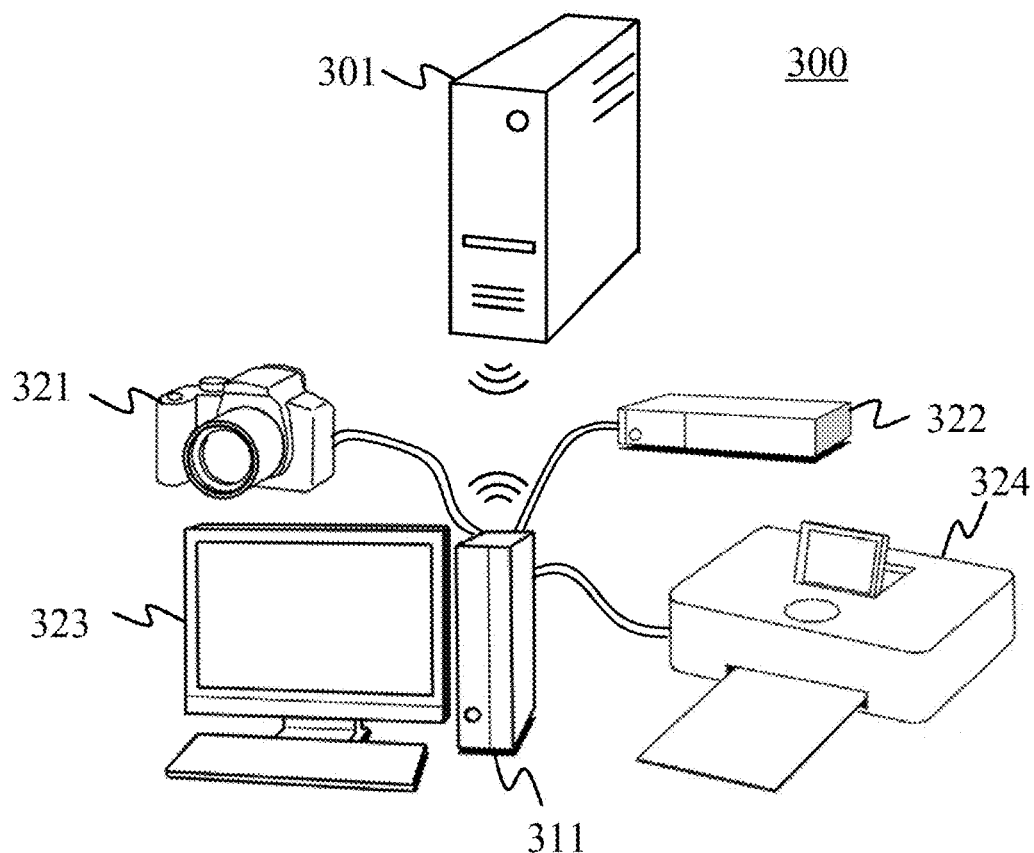
FIG. 11 is an overview of the image processing system according to the second embodiment.

Referring now to FIGS. 10 and 11, a description will be given of an image processing system 300 according to this embodiment. FIG. 10 is a block diagram of the image processing system 300. FIG. 11 is an overview of the image processing system 300. The image processing system 300 includes a learning unit 301, an image processing apparatus 311, an imaging apparatus 321, a recording medium 322, a display unit 323, and an output unit 324.

The learning unit 301 includes a memory 302 and a learning unit 303. The learning unit 303 executes the learning step to calculate the filter necessary for the correction step. At this time, a plurality of training images and ground truth images stored in the memory 302 are used. This embodiment uses two training images for one ground truth image. The two training images are a blurred image in which the blur is applied to the ground truth image and an intermediate corrected image in which the blurred image is corrected by the Wiener filter. In generating the latter, other methods such as RL (Richardson-Lucy) method and MAP (Maximum a posteriori) method may be used. The learned filter is stored in the memory 302.

The image processing apparatus 311 is an apparatus that executes the correction step, and includes a memory 312 and a corrector 313. The corrector 313 serves as the inverter 102a, the changer 102b, and the generator 102c in the first embodiment. The image processing apparatus 311 acquires a captured image that is a RAW image from the imaging apparatus 321 connected by wire or wirelessly or the recording medium 322, such as a semiconductor memory, and stores the captured image in the memory 312. The captured image acquired by the image processing apparatus 311 is an image captured by an interchangeable lens type imaging apparatus. There are a plurality of types of imaging apparatuses as the imaging apparatus 321. The corrector 313 acquires information on the imaging apparatus 321 and the imaging optical system used to obtain the captured image from the captured image, and reads information on the corresponding optical transfer function (OTF) from the memory 312. The corrector 313 calculates a Wiener filter from the OTF, and generates an intermediate corrected captured image obtained by applying the Wiener filter to the captured image. The corrector 313 uses CNN to generate a corrected captured image based on the intermediate corrected captured image and the captured image.

The image processing apparatus 311 and the learning unit 301 are connected by wire or wirelessly. The image processing apparatus 311 reads the filter stored in the memory 302, and the corrector 313 uses the filter. Information on the imaging apparatus 321 and the imaging optical system used to obtain the captured image is also used to select a filter to be read. The corrected image is output to at least one of the recording medium 322, the display unit 323, and the output unit 324. The display unit 323 is, for example, a liquid crystal display or a projector. The user can work while confirming the image being edited via the display unit 323. The output unit 324 is a printer or the like. The image processing apparatus 311 may serve to perform development processing and the like.

Referring now to FIG. 4, a description will be given of the learning step executed by the learning unit 303. A description similar to the first embodiment will be omitted. First, in the step S101, the learning unit 303 sets the blur condition for batch learning. In this embodiment, not only the imaging optical system but also the type of the imaging apparatus 321 is not fixed, and thus the blurring freedom degree is higher than that in the first embodiment. In addition to the type of the imaging optical system, the lens state, the image height, and the azimuth, the pixel pitch, the pixel aperture, the arrangement of the color filter array, and the presence/absence and the type of the optical low-pass filter are variable. Hence, a range of the blur change is wide, and in order to correct all blurs with the CNN, a filter with a huge data amount is required.

Accordingly, not only a captured image (a blurred image in learning) but also an image corrected by a Wiener filter is input to the CNN. Since the information required for the CNN to perform the blur correction increases, a highly accurate correction can be performed robustly even for a wide range of blur changes. Thus, this embodiment divides learning only by the type of the imaging optical system, and collectively learns all variations regarding the lens state, image height, azimuth, pixel pitch, pixel aperture, and optical low-pass filter. The arrangement of the color filter array is dealt with by learning only a specific arrangement and by devising the extraction position of the captured image. In this embodiment, the arrangement of the color filter array to be learned is G1, R, B, and G2.

Figure 5:
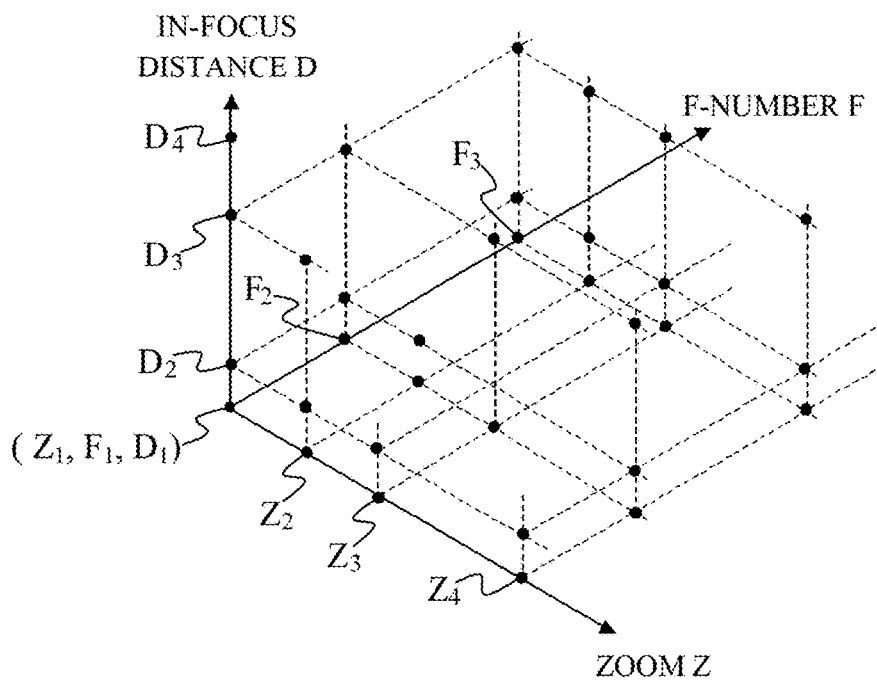
FIG. 5 is an explanatory diagram of a lens state division according to the first and third embodiments.
Figure 12:
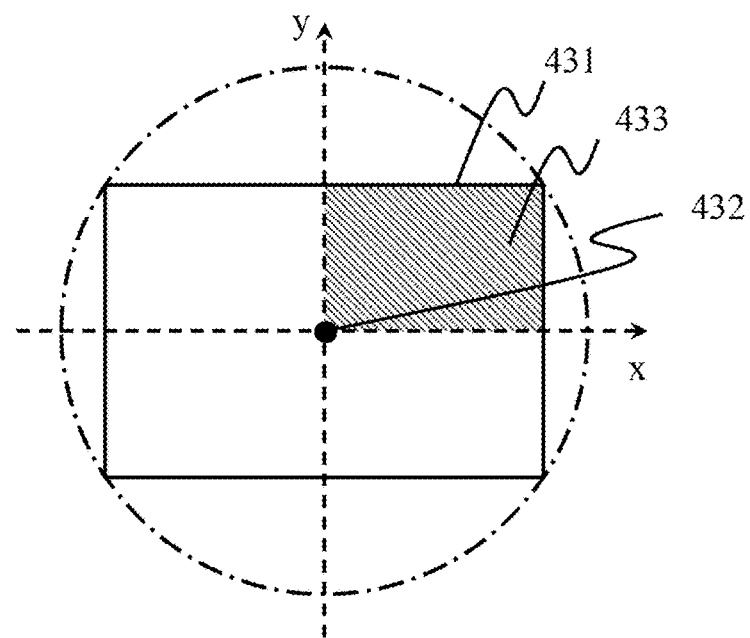
FIG. 12 is an explanatory diagram of the azimuth division according to the second embodiment.

The lens state uses the entire ZFD space illustrated in FIG. 5. The image height and azimuth learn a range (hatched portion 433) corresponding to the first quadrant of the captured image 431, as illustrated in FIG. 12, which is an explanatory diagram of the azimuth division. Here, a black dot 432 indicates a point (reference point) corresponding to the optical axis of the imaging optical system. In this embodiment, the reason why the azimuth range is wider than that in the second embodiment is that there is an imaging apparatus that employs horizontal (vertical) two-point separation in the optical low-pass filter. The pixel pitch is also an option that can take the pixel pitch used in a plurality of types of imaging apparatuses. When there is no optical low-pass filter, it is an option that can take the horizontal (vertical) two-point separation or four-point separation.

Next, in the step S102 in FIG. 4, the learning unit 303 acquires a plurality of training images and ground truth images. A blur selected at random within the condition set in the step S101 is applied to each ground truth image so as to generate a blurred image. Noises are also added if necessary. The Wiener filter calculated from the above blur is applied to the generated blurred image so as to generate an intermediate corrected image in which the blur is corrected. In the intermediate corrected image, a high-frequency component that has become very weak (or disappeared) due to blurring is not corrected, and ringing and a noise amplification occur. Two images, i.e., an intermediate corrected image and a blurred image, are used as training images.

Figure 13:
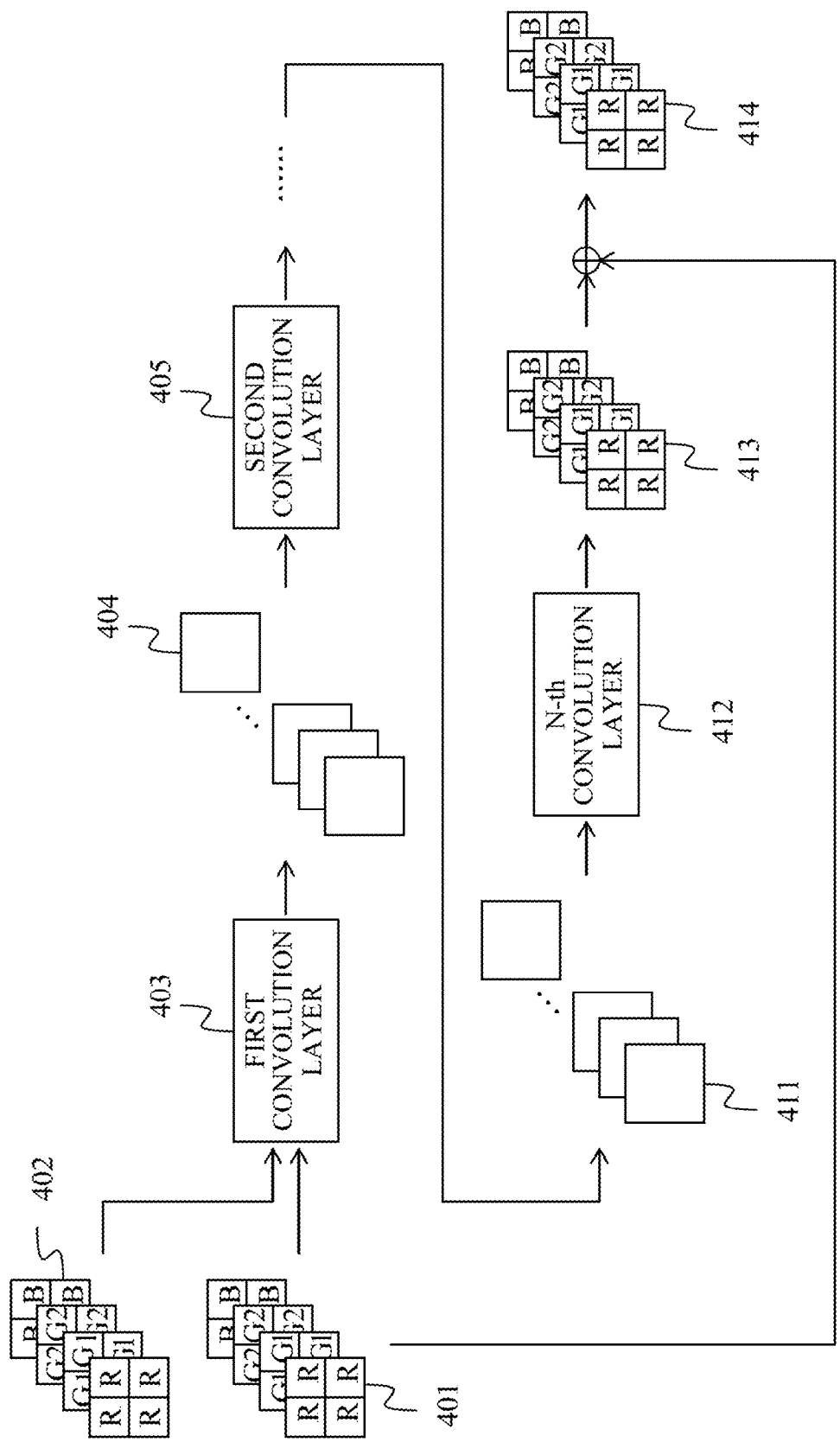
FIG. 13 is an explanatory diagram of a convolution neural network according to the second embodiment.

Next, in the step S103, the learning unit 303 determines a CNN filter based on the plurality of training images and the ground truth image. This embodiment uses the network configuration illustrated in FIG. 13. FIG. 13 is an explanatory diagram of the CNN according to this embodiment. A blurred image 401 and an intermediate corrected image 402, which are training images, are rearranged and input into four-channel images of R, G1, G2, and B. The blurred image 401 and the intermediate corrected image 402 are stacked in the channel direction, and totally eight channels of images are input to a first convolution layer 403 as training images. The first convolution layer 403 calculates the sum of convolution with a plurality of filters and bias. A first feature map 404 is a summary of the results calculated for each filter. The first feature map 404 is input to the second convolution layer 405, to similarly calculate the sum of the convolution with a plurality of new filters and the bias. The result obtained by repeating this operation and by inputting an (N-1)-th feature map 411 to an N-th convolution layer 412 is a corrected component 413. A corrected image 414 is obtained by the sum of the blurred image 401 and the corrected component 413. An error between the corrected image 414 and the ground truth image is calculated, and the CNN filter and bias are updated.

Next, in the step S104 in FIG. 4, the learning unit 303 determines whether or not the calculation of the filter has been completed for all imaging optical systems to be blur-corrected performed by the image processing apparatus 311. When the calculation of the filter has been completed for all blur conditions, the flow proceeds to the step S105. On the other hand, if the calculation of the filter has not been completed, the flow returns to the step S101, and the filter is learned for the new imaging optical system. In the step S105, the learning unit 303 outputs a filter. The filter calculated and output by the learning unit 303 is stored in the memory 302.

Figure 14:
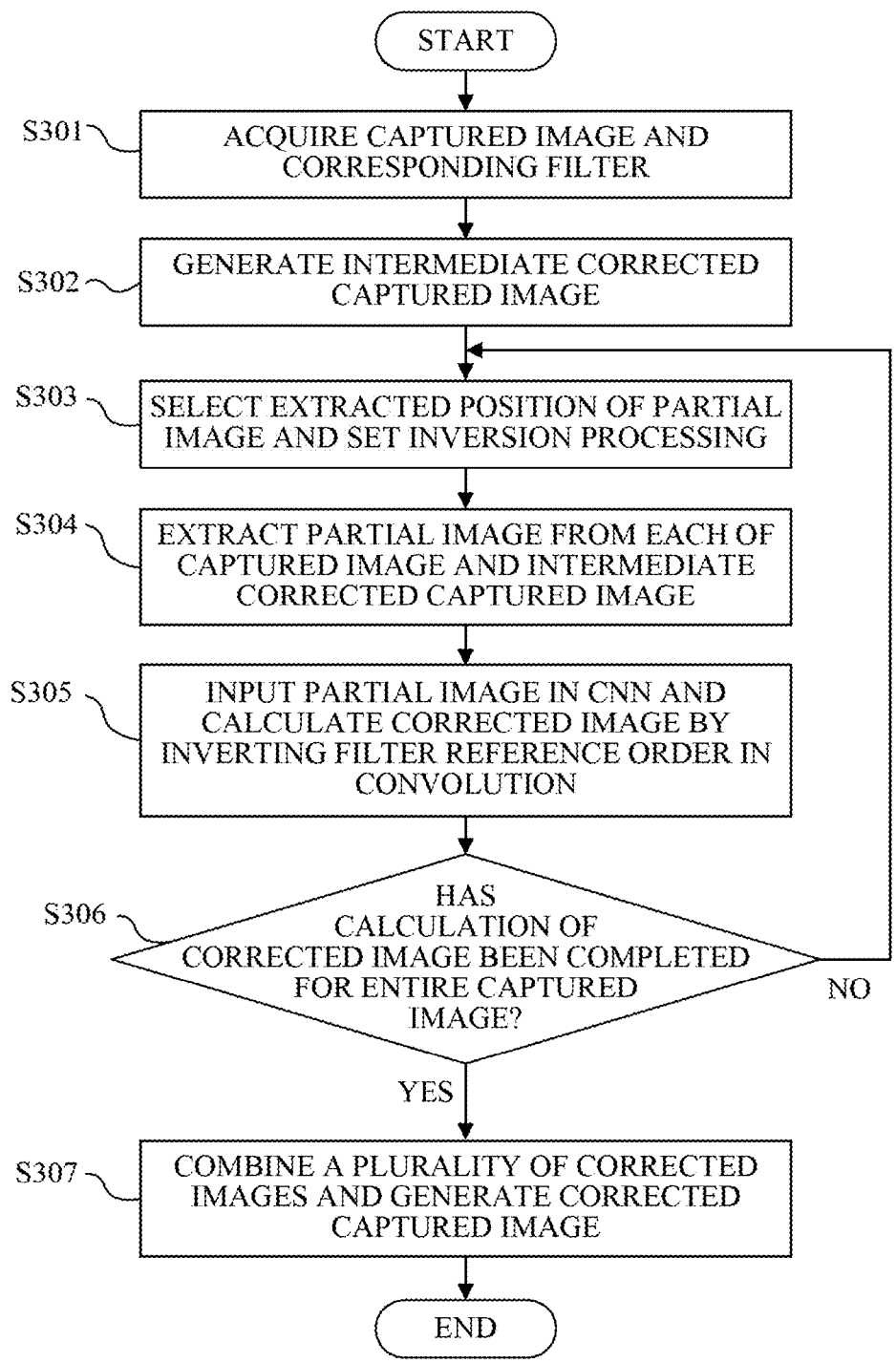
FIG. 14 is a flowchart of correction step in the second embodiment.

Referring now to FIG. 14, a description will be given of a captured image correction step (blur correction) executed by the corrector 313 in the image processing apparatus 311. FIG. 14 is a flowchart of the captured image correction step. Each step in FIG. 14 is mainly executed by the corrector 313. In FIG. 14, a description similar to that of the first embodiment described with reference to FIG. 8 will be omitted.

First, in the step S301, the corrector 313 acquires a captured image, and reads out a filter corresponding to the acquired imaging optical system from the memory 312. Next, in the step S302, the corrector 313 applies a Wiener filter to the captured image to generate an intermediate corrected captured image. In order to correct a blur with the Wiener filter having a small data amount to be stored, for example, a method disclosed in Japanese Patent No. 5274623 or 5541750 is applicable. Since the CNN described later suppresses an adverse effect, such as the ringing and noise amplification, associated with the correction of the Wiener filter, the gain of the Wiener filter may be made higher.

Next, in the step S303, the corrector 313 selects the extraction position (region) of the partial image extracted in the step S304, and sets the inversion axis of the inversion processing corresponding to the partial image (switches inversion processing setting). Since the filter is learned for the blur in the first quadrant, the inversion processing is not performed when the partial image is in the first quadrant. For the second quadrant to the fourth quadrant, the lateral inversion is made (90° axis inversion), the longitudinal and lateral inversions are made (0° axis inversion and 90° axis inversion), and the longitudinal inversion is made (0° axis inversion), respectively. This embodiment devises the selection of the extraction position of the partial image so as to handle the inconsistency between the learning and the color filter array arrangement of the captured image and the change in the color filter array arrangement of the partial image due to the inversion.

Figure 15:
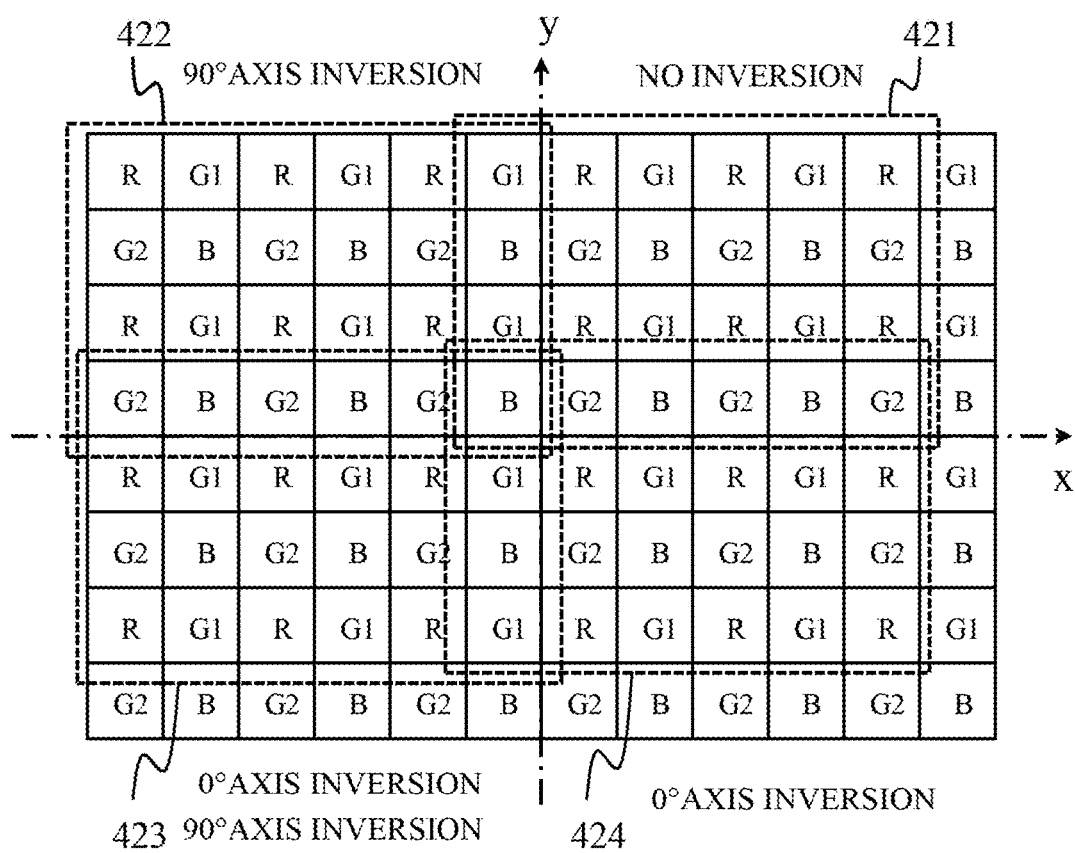
FIG. 15 is an explanatory diagram of a partial image extraction position according to the second embodiment.

Referring to FIG. 15, a description will be Liven of an selection example of the extraction position of the partial image in S303. FIG. 15 is an explanatory diagram of the extraction position of the partial image, and illustrates that the arrangement of the color filter array of the captured image is R, G1, G2, and B. Since the learned arrangement of the color filter array is G1, R, B, and G2, the first quadrant of the captured image cannot be corrected as it is. Hence, an extraction position 421 is selected in the first quadrant. In other words, this embodiment determines the positional relationship among the color components in the input image such that the positional relationship among the color components in the partial image is the positional relationship corresponding to the inversion axis, and extracts a partial image by cutting out the captured image at the extraction position based on the positional relationship. Thereby, the arrangement of the color filter array in the extracted partial image becomes G1, R, B, and G2, and the learned filter can be used. Similarly, the extraction positions 422 to 424 are selected for the second to fourth quadrants, respectively. This configuration can cancel a discordance between the learning and the color filter array arrangement of the input image, and the change in the color filter array arrangement of the partial image caused by the inversion processing. In FIG. 15, the entire n-th (n=1 to 4) quadrant is selected as the extraction position of the partial image, but the present invention is not limited to this embodiment and allows the n-th quadrant to be divided into a plurality of parts to set each part to an extraction position.

Next, in the step S304 in FIG. 14, a partial image is extracted from each of the captured image and the intermediate corrected captured image. The partial image is extracted from the extraction position selected in the step S303. The intermediate captured corrected image may be generated any time before the step S304.

Next, in the step S305, the corrector 313 inputs two partial images as input images to the CNN, and calculates a corrected image. At this time, the network described with reference to FIG. 13 can be used. The blurred image 401 in FIG. 13 corresponds to a partial image of the captured image, and an intermediate corrected image 402 corresponds to a partial image of the intermediate corrected image. Each partial image is arranged in a four-channel image of R, G1, G2, and B. As the filter, the filter acquired in the step S301 can be used.

In this embodiment, the corrector 313 inverses the reference order of the filters in performing a convolution operation between the feature map output from the input image and each convolution layer of the CNN and the filter.

Figures 16A, 16B, 16C:
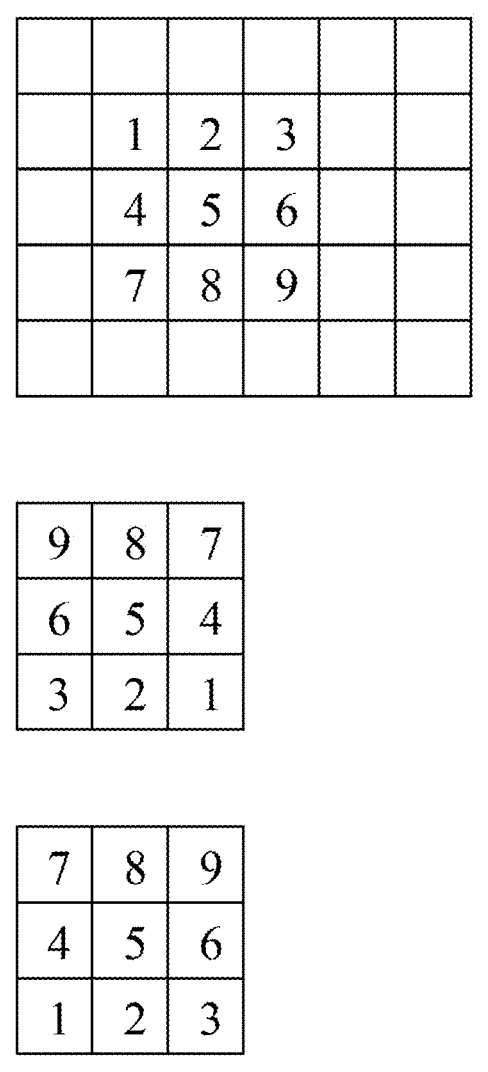

FIGS. 16A to 16C are explanatory diagrams of the reference order of the convolution operation according to this embodiment. FIG. 16A illustrates an input image or feature map. FIGS. 16B and 16C each illustrate a 3×3 filter. However, the size of the filter is not limited to this embodiment. The normal convolution operation calculates the product of the values stored in the same numbers in FIGS. 16A and 16B. If the inversion processing determined in the step S303 is 90° axis inversion, the filter reference order is also inverted by the 90° axis. Therefore, in the convolution at this time, the product of the values stored in the same numbers in FIGS. 16A and 16C is calculated.

Next, in the step S306 in FIG. 14, the corrector 313 determines whether or not the calculation of the corrected image has been completed for the entire captured image. If the calculation of the corrected image has not been completed, the flow returns to the step S303. Then, the corrector 313 newly selects a region where the corrected image is not calculated as an extraction position. On the other hand, when the calculation of the corrected image has been completed, the flow proceeds to the step S307. In the step S307, the corrector 313 generates a corrected captured image by combining a plurality of corrected images.

This embodiment can provide an image processing system that can correct an optical performance deterioration of a captured image with high accuracy while reducing a data amount of the filter to be stored. This embodiment uses two images, i.e., the captured image and the intermediate corrected captured image, as the input image to the CNN. However, a more accurate blur correction is available by obtaining the input image only from each of the intermediate corrected captured image.

When the input image is rearranged in channel images of respective colors such as R, G1, G2, and B as illustrated in the network in FIG. 13, it is necessary to distinguish G1 and G2 from each other. Hence, when ±45° axis inversion exists as in the first embodiment and the relative positions of G1 and G2 change relative to RB, the channels of the input image must be arranged in order of R, G2, G1, and B. If the order is unchanged, the positional relationship among the color components is lost, so that the CNN cannot correctly recognize the structure such as the edge etc. and the correction accuracy deteriorates.

When the arrangement of color filter arrays (positional relationship among the color components) and the azimuth range during learning can change, information on them may be associated (tagged) with the learned filter. The information is acquired during the blur correction, and based on this information, a change of the positional relationship among the color components in the partial image and the inversion processing can be controlled. In this embodiment, since the type of the image sensor changes, the optical black signal value or the like can change. Hence, the input image to the CNN may be normalized by subtracting the optical black signal value.

Third Embodiment

Next follows a description of an image processing system according to a third embodiment of the present invention. The image processing system according to this embodiment includes an imaging apparatus 500 (user terminal) as a first apparatus that substantially controls image processing, and an image processing apparatus (server) as a second apparatus that performs image processing based on an instruction from the imaging apparatus 500.

Figure 17:
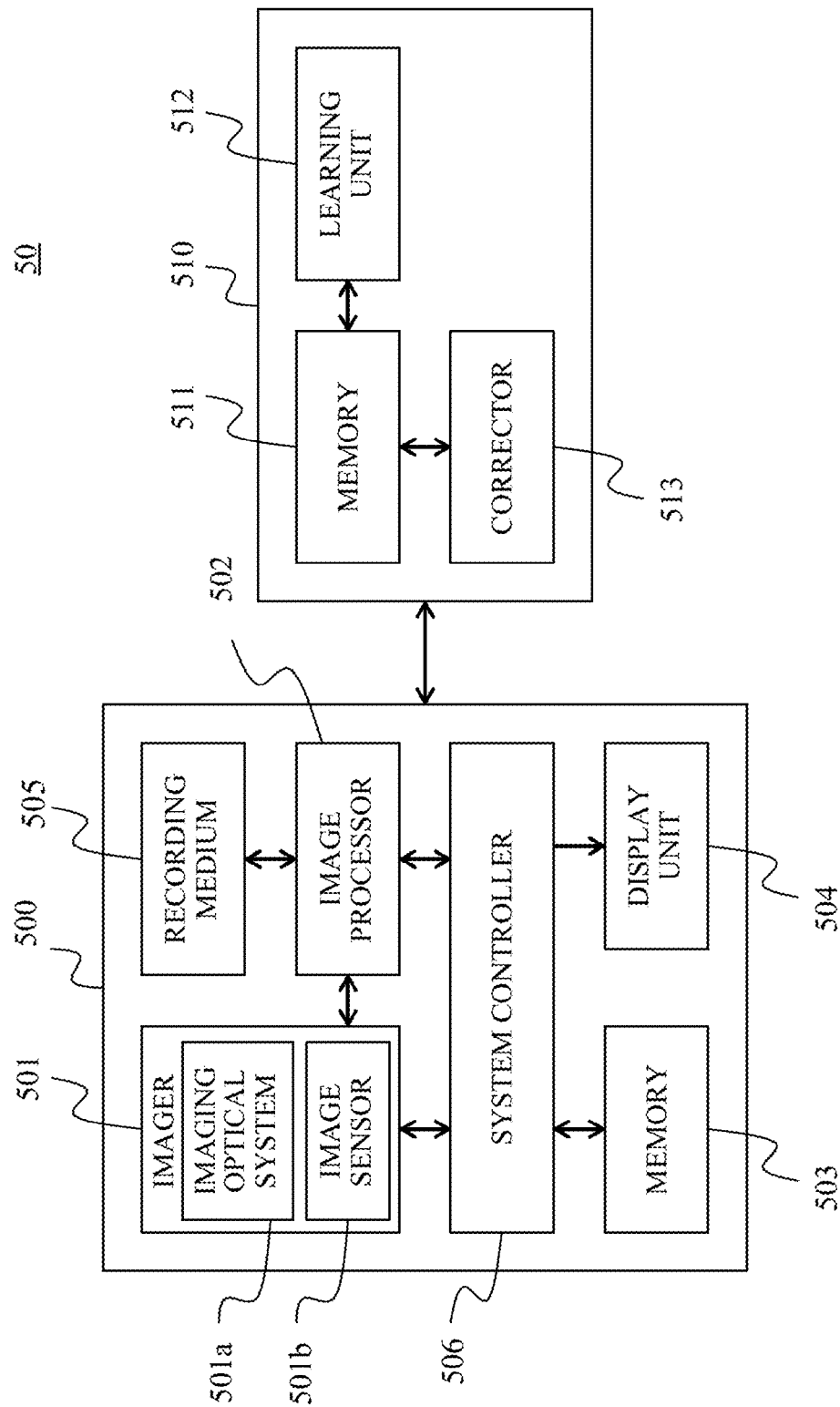
FIG. 17 is a block diagram of an image processing imaging system according to a third embodiment.
Figure 18:
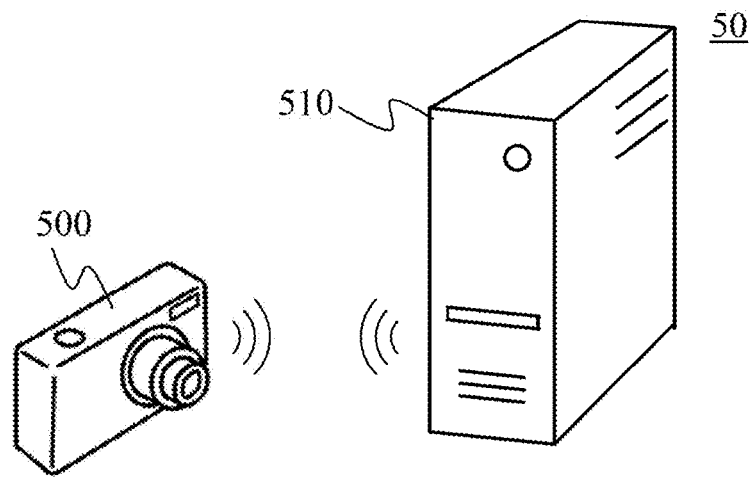
FIG. 18 is an overview of an image processing imaging system according to the third embodiment.

Referring now to FIGS. 17 and 18, a description will be given of the image processing system 50 according to this embodiment. FIG. 17 is a block diagram of the image processing system 50. FIG. 18 is an overview of the image processing system 50. The image processing system 50 includes the imaging apparatus 500 and an image processing apparatus 510.

The imaging apparatus 500 includes an imager 501 that captures an image of the object space. The imager 501 includes an imaging optical system 501a and an image sensor 501b. The captured image is input to an image processing unit 502, converted into a four-channel image having R, G1, G2, and B in the Bayer array as channel components, and stored in a memory 503. In addition, the imaging apparatus 500 transmits the image to the image processing apparatus 510 together with a request for causing the image processing apparatus 510 to execute the correction step relating to the image stored in the memory 503. The image processing apparatus 510 includes a memory 511, a learning unit 512, and a corrector 513. The image processing apparatus 510 executes the correction step for the transmitted image in response to receiving the request transmitted from the imaging apparatus 500.

The corrector 513 has the same functions as those of the inverter 102a, the changer 102b, and the generator 102c in the first embodiment, and corrects the blur of the captured image that occurs during imaging. During the blur correction, the corrector 513 reads out and uses the filter stored in the memory 511. The filter is a filter previously learned by the learning unit 512. The corrected captured image that has undergone the blur correction is transmitted again to the imaging apparatus 500 and recorded in the recording medium 505. When the user views the corrected captured image, the corrected captured image is displayed on the display unit 504. A series of control is performed by the system controller 506.

Figure 19:
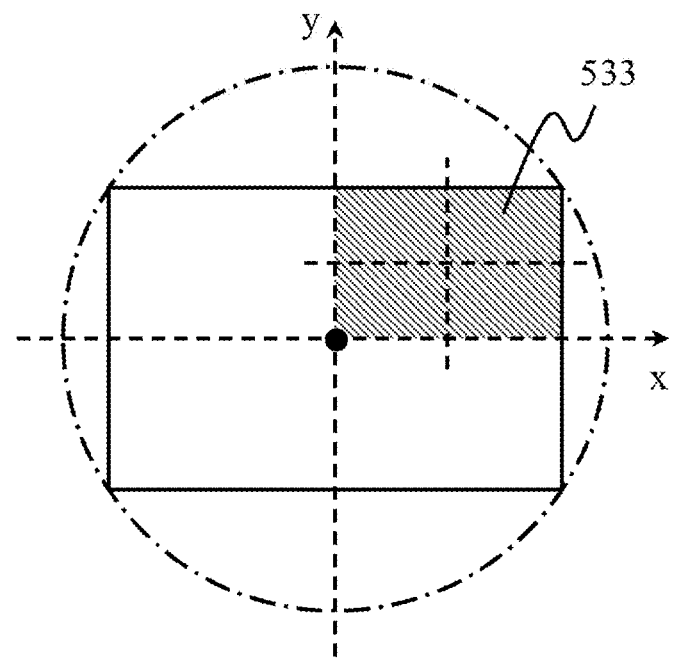
FIG. 19 is an explanatory diagram of an azimuth division according to the third embodiment.

Referring now to FIG. 4, a description will be given of the learning step executed by the learning unit 512. A description similar to the first embodiment or the second embodiment will be omitted. First, in the step S101, the learning unit 512 sets a blur condition for batch learning. The imaging apparatus 500 is not a lens interchangeable type imaging apparatus, but a lens integrated type imaging apparatus. Hence, there is only one type of imaging optical system to be corrected. The image sensor 501b also does not change and there is no optical low-pass filter. Thus, the variable condition includes a lens state, an image height, and an azimuth. The lens state is divided in the same manner as in the first embodiment. As for the image height and azimuth, as illustrated in FIG. 19, which is an explanatory diagram of the azimuth division, the first quadrant (hatched portion 533) is divided into four, and learning is performed individually for each region. However, the number of divisions is not limited to this embodiment.

Next, in the step S102 in FIG. 4, the learning unit 512 acquires a plurality of training images and ground truth images. The learning unit 512 generates a training image by applying a blur within the condition determined in the step S101 to the ground truth image. The training image and the ground truth image are four-channel images each having R, G1, G2, and B in the Bayer array as channel components. Subsequent steps S103 to S105 are the same as those in the first embodiment, and thus a description thereof will be omitted. As the CNN, a network similar to that in FIG. 1 can be used. However, the input and output images are four-channel images.

Referring now to FIG. 8, a description will be given of the correction step executed by the corrector 513. A description similar to the first embodiment will be omitted. The correction step in this embodiment is performed when the image processing apparatus 510 receives a request for an execution of correction step relating to an image from the imaging apparatus 500. The captured image acquired in the step S201 is a four-channel image having R, G1, G2, and B as channel components in the Bayer array. This embodiment needs different filters depending on the position of the partial image in the captured image. Hence, the filter is acquired in the following step S202.

Next, in the step S202, the corrector 513 extracts a partial image from the captured image. In other words, the corrector 513 extracts one of the regions obtained by dividing the n-th quadrant into four. The corrector 513 reads and acquires a filter corresponding to the extracted area from the memory 511. In the step S204, unlike the first embodiment, the positional relationship among the color components is changed using a pixel shift instead of the deletion. This step will be described with reference to FIG. 20.

Figure 20:
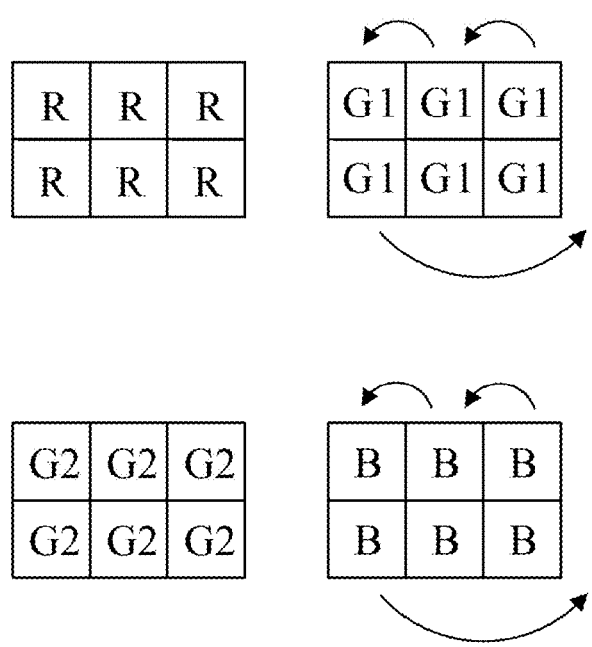
FIG. 20 is an explanatory diagram of changing a positional relationship among color components according to the third embodiment.

FIG. 20 is an explanatory diagram of changing the positional relationship among the color components, and illustrates an example in which when both learning and the arrangement of the color filter array of the image sensor 501b are R, G1, G2, and B, a partial image is extracted from the second quadrant of the captured image. FIG. 20 illustrates each channel side by side. Since learning is performed for the first quadrant, the 90° axis inversion is set to the second quadrant. Thus, the partial images after the inversion processing are G1, R, B, and G2. As a result, in the four-channel image, the relative positional relationship among the color components at the same position changes. In order to correct this problem, the G1 and B channel images are shifted by one pixel in the horizontal direction as illustrated in FIG. 20. This corresponds to the operation where the first column is shifted to the back of the last column in the Bayer array partial image in the first embodiment. The steps S205 to S208 in FIG. 8 are similar to those in the first embodiment, and thus a description thereof will be omitted. The image processing apparatus 510 transmits the corrected captured image generated in the step S208 to the imaging apparatus 500.

This embodiment can provide an image processing system that can suppress an increase in a data amount of a filter to be stored and correct an optical performance deterioration of a captured image with high accuracy. In this embodiment, since the processing by the generator 102c having a relatively large processing load is performed by the server (image processing apparatus 510), the high-performance image processing service can be realized even if the processing capacity of the user terminal (imaging apparatus 500) is not high.

Modification

In the image processing system according to the third embodiment, the image processing apparatus 510 includes the corrector 513 having the same functions as those of the inverter 102a, the changer 102b, and the generator 102c in the first embodiment, but the present invention is not limited to this embodiment. The imaging apparatus 500 may include the inverter 102a and the changer 102b, and the image processing apparatus 510 may include the generator 102c. In this case, the image capturing apparatus 500 may transmit to the image processing apparatus 510 an input image that has been undergone the inversion processing and the change processing of the positional relationship among the color components by the inverter 102a and the changer 102b together with a request for the image processing. Similar to the third embodiment, this configuration can thereby realize a sophisticated image processing service even if the processing capability of the user terminal (imaging apparatus 500) is not so high. This is because the processing in the generator 102c has a higher load than that of the processing in the inverter 102a and the change unit 102b.

As described above, in each embodiment, the image processing apparatus (the image processor 102, the image processing apparatus 311 or 510) uses a multilayer neural network to generate a corrected captured image in which an optical performance deterioration is corrected based on the captured image. The inverter 102a sets the inversion processing to at least part of the captured image or the filter of the neural network (S203, S303). The changer 102b changes the positional relationship among the color components based on the inversion processing for at least part of the captured image input to the neural network (S204, S304). The generator 102c calculates corrected images output from the neural network for different inversion processing, and generates the corrected captured image by combining a plurality of corrected images (S205 to S208, S305 to S307). The inverter may switch the type of the inversion processing based on the position centered on the reference point in the step of setting the inversion processing. The inverter may set the inversion processing corresponding to each of the plurality of extracted partial images based on a region (largest region) having the largest area that occupies the partial image among a plurality of regions obtained by dividing the captured image for each integer multiple of 45° around the reference point.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each embodiment, an image processing method, an image processing apparatus, an imaging apparatus, a program, and a storage medium that can correct optical performance deterioration of a captured image with high accuracy while suppressing an increase in data amount can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2018-188744, filed on Oct. 4, 2018 and 2019-159507, filed on Sep. 2, 2019, which are hereby incorporated by reference herein in their entirety.

What is claimed is:

1. An image processing method of correcting at least part of a captured image using a neural network, the image processing method comprising:

a first step of determining, according to a position of a partial image of the captured image, an inversion axis that is a line on the partial image or on a filter of the neural network, the inversion axis being defined by an azimuth;

a second step of determining, based on the inversion axis, a positional relationship among pixels of color components in an input image that is generated from the captured image based on the positional relationship and is input to the neural network;

a third step of:
- in a case where the first step determines the inversion axis on the partial image, generating the input image by spatially inverting the partial image with respect to the inversion axis determined by the first step and by adjusting arrangement of color components in the input image so as to correspond to the positional relationship determined by the second step; and
- in a case where the first step determines the inversion axis on the filter of the neural network, spatially inverting the filter of the neural network with respect to the inversion axis determined by the first step and generating the input image by adjusting the arrangement of color components in the input image so as to correspond to the positional relationship determined by the second step; and a fourth step of generating a corrected image by correcting the generated input image by processing the input image using the neural network.

2. The image processing method according to claim 1, further comprising:

a combining step of generating a corrected captured image obtained by correcting the captured image by combining a plurality of corrected images calculated for a plurality of partial images, wherein the plurality of partial images include a first partial image and a second partial image in which the inversion axis different from that of the first partial image is determined in the first step.

3. The image processing method according to claim 2, wherein the neural network is common to the first partial image and the second partial image.

4. The image processing method according to claim 2, wherein the first partial image includes part of the second partial image.

5. The image processing method according to claim 1, wherein the fourth step generates the input image by cutting out part of the captured image in an area determined based on the positional relationship.

6. The image processing method according to claim 1, wherein the fourth step generates the input image by deleting a partial pixel in the partial image or by changing a position of a partial pixel of the partial image based on the positional relationship.

7. The image processing method according to claim 1, further comprising:

a step of extracting a plurality of partial images from the captured image, wherein the first step determines an inversion axis for each of a plurality of extracted partial images, based on the largest region as the largest area occupied by the partial images, among a plurality of regions made by dividing the captured image for each angle of integer multiple of 45° around a reference point.

8. The image processing method according to claim 7, wherein the reference point is a point corresponding to an optical axis of an imaging optical system used to generate the captured image.

9. The image processing method according to claim 7, wherein the first step performs the inversion processing based on a position in the captured image of a region including the partial image among the plurality of regions.

10. The image processing method according to claim 1, wherein the second step determines the positional relationship based on a positional relationship among color components in a training image used for learning of the neural network.

11. The image processing method according to claim 1, wherein the corrected image is an image in which an optical degradation in the captured image is corrected.

12. An image processing apparatus for correcting at least part of a captured image using a neural network, the image processing apparatus comprising:

at least one processor configured to execute a plurality of tasks, including:
- an inversion determining task that determines, according to a position of a partial image of the captured image, an inversion axis that is a line on the partial image or on a filter of the neural network, the inversion axis being defined by an azimuth;
- a color determining task that determines, based on the inversion axis, a positional relationship among pixels of color components in an input image that is generated from the captured image based on the positional relationship and is input to the neural network;
- an image generating task that:
  - in a case where the inversion determining task determines the inversion axis on the partial image, generates the input image by spatially inverting the partial image with respect to the inversion axis determined by the inversion determining task and by adjusting arrangement of color components in the input image so as to correspond to the positional relationship determined by the color determining task; and
  - in a case where the inversion determining task determines the inversion axis on the filter of the neural network, spatially inverts the filter of the neural network with respect to the inversion axis determined by the first step and generates the input image by adjusting the arrangement of color components in the input image so as to correspond to the positional relationship determined by the color determining task; and
- a corrected image generating task that generates a corrected image by correcting the input image by processing the generated input image using the neural network.

13. The image processing apparatus according to claim 12, further comprising a memory configured to store a filter used in the neural network.

14. An imaging apparatus comprising:
an imager configured to capture an object image; and
the image processing apparatus according to claim 12.

15. An image processing system comprising:
a first apparatus; and
a second apparatus,
wherein the first apparatus includes a transmitter configured to transmit a request for causing the second apparatus to execute processing for correcting a captured image, and wherein the second apparatus includes:
   a receiver configured to receive the request;
   at least one processor configured to execute a plurality of tasks, including:
      an inversion determining task that determines, according to a position of a partial image of the captured image, an inversion axis that is a line on the partial image or on a filter of the neural network, the inversion axis being defined by an azimuth;
      a color determining task determines, based on the inversion axis, a positional relationship among pixels in color components of an input image that is generated from the captured image based on the positional relationship and is input to the neural network;
      an image generating task that:
         in a case where the inversion determining task determines the inversion axis on the partial image, generates the input image by spatially inverting the partial image with respect to the inversion axis determined by the inversion determining task and by adjusting arrangement of color components in the input image so as to correspond to the positional relationship determined by the color determining the task; and
         in a case where the inversion determining task determines the inversion axis on the filter of the neural network, spatially inverts the filter of the neural network with respect to the inversion axis determined by the first step and generates the input image by adjusting the arrangement of color components in the input image so as to correspond to the positional relationship determined by the color determining task; and
      a corrected image generating task that generates a corrected image by correcting the input image by processing the generated input image using the neural network.

16. A non-transitory computer-readable storage medium storing a program executable by a computer to execute an image processing method of corrrecting at least part of a captured image using a neural network, the image processing method comprising:

a first step of determining, according to a position of a partial image of the captured image, an inversion axis that is a line on the partial image or on a filter of the neural network, the inversion axis being defined by an azimuth;

a second step of determining, based on the inversion axis, a positional relationship among pixels of color components in an input image that is generated from the captured image based on the positional relationship and is input to the neural network;

a third step of:
   in a case where the first step determines the inversion axis on the partial image, generating the input image by spatially inverting the partial image with respect to the inversion axis determined by the first step and by adjusting arrangement of color components in the input image so as to correspond to the positional relationship determined by the second step; and
   in a case where the first step determines the inversion axis on the filter of the neural network, spatially inverting the filter of the neural network with respect to the inversion axis determined by the first step and generating the input image by adjusting the arrangement of color components in the input image so as to correspond to the positional relationship determined by the second step; and a fourth step of generating a corrected image by correcting the generated input image by processing the input image using the neural network.

* * * * *